United States Patent [19]
Carbrey et al.

[11] 3,903,370
[45] Sept. 2, 1975

[54] LINE SWITCH CONTROLLER FOR A TIME DIVISION SWITCHING SYSTEM

[75] Inventors: Robert Lawrence Carbrey, Boulder; John Christian Moran, Broomfield, both of Colo.

[73] Assignee: Bell Telephone Laboratories, Incorporated, Murray Hill, N.J.

[22] Filed: Dec. 21, 1973

[21] Appl. No.: 427,335

[52] U.S. Cl. .......................... 179/15 AT; 179/15 AQ
[51] Int. Cl.[2] .......................... H04J 3/16
[58] Field of Search ......... 179/15 A, 15 AT, 15 BY, 179/15 AQ, 18 J

[56] References Cited

UNITED STATES PATENTS 3,743,788 7/1973 Krupp .......................... 179/15 AQ
3,787,633 1/1974 Busch .......................... 179/15 AT
3,818,142 6/1974 Edstrom .......................... 179/15 AQ
3,819,865 6/1974 Weber .......................... 179/15 AT
3,825,690 7/1974 Kelly .......................... 179/15 AQ

*Primary Examiner*—Ralph D. Blakeslee
*Attorney, Agent, or Firm*—D. M. Duft

[57] ABSTRACT

A time division switching system is disclosed having a memory that is selectively addressable to associate time slots with ports on a time division bus. The memory is also content addressable upon the receipt of slot number information to generate output signals identifying the ports associated with each received slot number. Output signals are extended from the memory over separate paths to line switches to close each line switch serving a call during the time slot to which the call is assigned.

15 Claims, 14 Drawing Figures

SLOT LOGIC

FIG. 10

| STATUS | OP | CC | W | NEXT ADD | I/O CONTROL | SLOT STATUS | | COMPARE | | CAM |
|---|---|---|---|---|---|---|---|---|---|---|
| | | | | | | PORT ADD BUS | FRAME ADD BUS | M | P | |
| 1* IDLE | DTA | | | 2 | | PAC | | | | |
| 2 | DTA | | | 3 | ADV. PAC | | | | | |
| 3 | DEC | HOOK | ON | 7 | | | | ON | ON | |
| 4 | DEC | BIM | BUSY | 7 | | | | BUSY | BUSY | |
| 5 | DTAR | | | 8 | WRITE PAM | | FC | WRITE ZERO | WRITE ZERO | WRITE TALK SLOT |
| 6 | DTA | | | 9 | WRITE SAM | REG. REQ | | | | |
| 7 WAIT | WAIT | | | | | | | | | |
| 8 S BIM | DTR | | | | SET BIM | | | | | |
| 9 S PIP | DTA | | | 7 | START PIP | | | | | |
| 10 | | | | | | | | | | |
| 11* REG. REQ | DTA | | | 12 | SEARCH PAM | | FC | SEARCH FOR ZERO | SEARCH FOR ZERO | SEARCH TALK SLOT |
| 12 | DEC | MATCH | NO | 14 | | | | | | |
| 13 | DTA | | | 15 | | PAM OUT | | | | |
| 14 ALARM | DTA | | | 14 | | | | | | |
| 15 | DEC | HOOK | ON | DISCO | WRITE SAM IDLE | | | ON | ON | |
| | | | | | | | | | | |

FIG. 13 PAM MEMORY

LINE SWITCH CONTROLLER FOR A TIME DIVISION SWITCHING SYSTEM

BACKGROUND OF THE INVENTION

1. Field of the Invention

This invention relates to a telephone switching system and, in particular, to a system of the time division type. This invention further relates to a system having improved facilities for controlling the connection of line switches to a time division bus during assigned slot times.

2. Description of the Prior Art

The line switches of any time division switching system must connect each party involved on a call to the system time division bus only during an occurrence of the time slot to which the call is assigned. This is done by providing line switches which are normally open or nonconductive and which are interposed between the subscriber subsets or stations and the time division bus. Each line switch is normally open but may be closed in response to the receipt of a control potential from a system controller, or the like, to interconnect the bus with the subset or circuit connected to the other side of the switch. By this means, control signals are selectively and repetitively applied to the various line switches to connect the parties involved on a call to the bus during the slot time to which the call is assigned.

In order to apply the required control signals to the line switches, the system must store information indicating the current association of time slots and switches. In other words, during each occurrence of a time slot, the system must have information available indicating which line switches should be closed at that time. As well as having facilities for storing information of this type, each system must also have facilities for using this information to activate each busy line switch during its assigned time slot. The prior art uses two different types of control systems to perform the above-described functions.

The first of these arrangements may be termed a distributed memory system; the second is termed a central memory system. In the distributed memory system, the identity of the slot to which a line switch is assigned is stored in specially provided facilities including a storage element unique to each switch. The storage element is often a shift register. The shift register typically has a number of bits equal to the total number of time slots and the bit corresponding to the time slot during which the line switch is to be closed contains a 1. Each shift register is stepped one position per time slot and then read out. Whenever a 1 bit is read out of a register, the line switch associated with the register is closed for the duration of the time slot. A disadvantage of the distributed memory arrangement is the relatively large quantity of circuitry that is required to perform the control functions of writing information into the shift registers to associate line switches with time slots, of erasing information from the shift registers to remove the association of a line switch from a time slot upon the end of a call, and of controlling the step-by-step advance of the shift registers. This control circuitry typically includes complex circuitry including decoders and flip-flops.

The central memory system requires at least one word per time slot. Each word must have a plurality of fields. If, for example, on a conference call, three line switches must be connected to the bus during a time slot, the memory word for the slot must have three fields to identify each of the three switches. A disadvantage of the central memory arrangement is the problem of writing and reading information into and from the selected word as well as the problem of decoding the line switch information after it is read out of memory. This decoding function requires the use of extensive circuitry; it further requires the use of complicated data processing techniques including the use of data processors having arithmetic units and other appropriate logic circuitry.

Although both the distributed memory and the central memory arrangements operate satisfactory to perform their assigned functions, their cost and complexity is sufficiently great that it has so far tended to prevent the advantages of time division switching from being made available to small line systems, such as those in the 20- to 100- line size range.

BRIEF SUMMARY OF THE INVENTION

Objects

It is, therefore, an object of the invention to provide an improved time division switching system.

It is a further object to provide improved facilities for controlling time division line switches.

Summary Description

In accordance with our invention we provide a time division switching system having a single distributed memory for storing information indicating the association of time slots and line switches as well as for generating the control signals required to close each busy line switch during its assigned time slot. The memory is of the RAM type and is selectively addressable on write operations to assign line switches to time slots. This memory has a location individual to each switch and a switch is assigned to a time slot by writing the number of the slot in the word location of the switch. The switch number is received from other system elements which store this information and read it out at the proper time. The slot number is received from a slot counter which is incremented once per time slot and which continuously provides information indicating the current time slot.

The memory provided in accordance with our invention is also content addressable upon the receipt of only slot number information. This memory is connected to the slot counter and it receives updated slot number information upon each occurrence of a time slot. Upon the receipt of this information, the memory performs a content addressable search to determine each word location currently containing the received slot number. This memory has a plurality of output conductors each of which extends to a different one of the line switches. When a slot number is received and a content addressable search is performed, the line switches are identified and switch closing control signals are generated by the memory and applied over individual output conductors to each identified line switch.

The disclosed arrangement for controlling line switches is advantageous in that it requires only a single distributed memory. This memory does not require the system to perform any additional functions or to generate any additional information beyond that which is already provided for other control purposes. Instead, the memory requires only slot number and line switch number information. Both of these items of information are already required for many other purposes by the system.

Other inventions relating to the present system are disclosed in the following co-pending applications: S. L. Hight, J. C. Moran, N. T. Tsao-Wu Ser. No. 427,325 filed Dec. 21, 1973 entitled "Program Controlled Time Division Switching System" and R. L. Carbrey and N. T. Tsao-Wu Ser. No. 427,339 filed Dec. 21, 1973 entitled "Tone Control System for a Time Division Switching System."

Features

A feature of our invention is the provision of a time division switching system having a line switch control memory for storing information associating line switches and system time slots.

A further feature is the provision of a plurality of word locations in the memory with each location being unique to a different line switch.

A further feature is the provision of facilities for selectively writing slot numbers in the word locations to associate line switches with time slots.

A further feature is the provision of facilities for reading out the memory upon the receipt of slot information to close each line switch currently associated with the slot specified by the received information.

A further feature is the provision of facilities for selectively addressing the memory on a write operation to store a slot number in a selected word location unique to a line switch with the slot number representing the time slot to which a call is assigned that is currently being served by the line switch in whose memory location the slot number is stored.

Another further feature is the provision of facilities for applying a slot number to the memory upon each occurrence of the associated time slot together with facilities for effecting a content addressable search of the memory to identify the word locations currently storing the received slot number.

Still another further feature is the provision of facilities responsive to each content addressable search for applying line switch closing control signals to conductors extending to the line switches associated with the word locations identified during each content addressable search.

DESCRIPTION OF THE DRAWING

These and other objects and features of the invention will become more apparent upon a reading of the following description thereof taken in conjunction with the drawing in which:

FIG. 10 illustrates a typical system program subroutine;

GENERAL DESCRIPTION — FIGS. 1 AND 2

Figure 1:
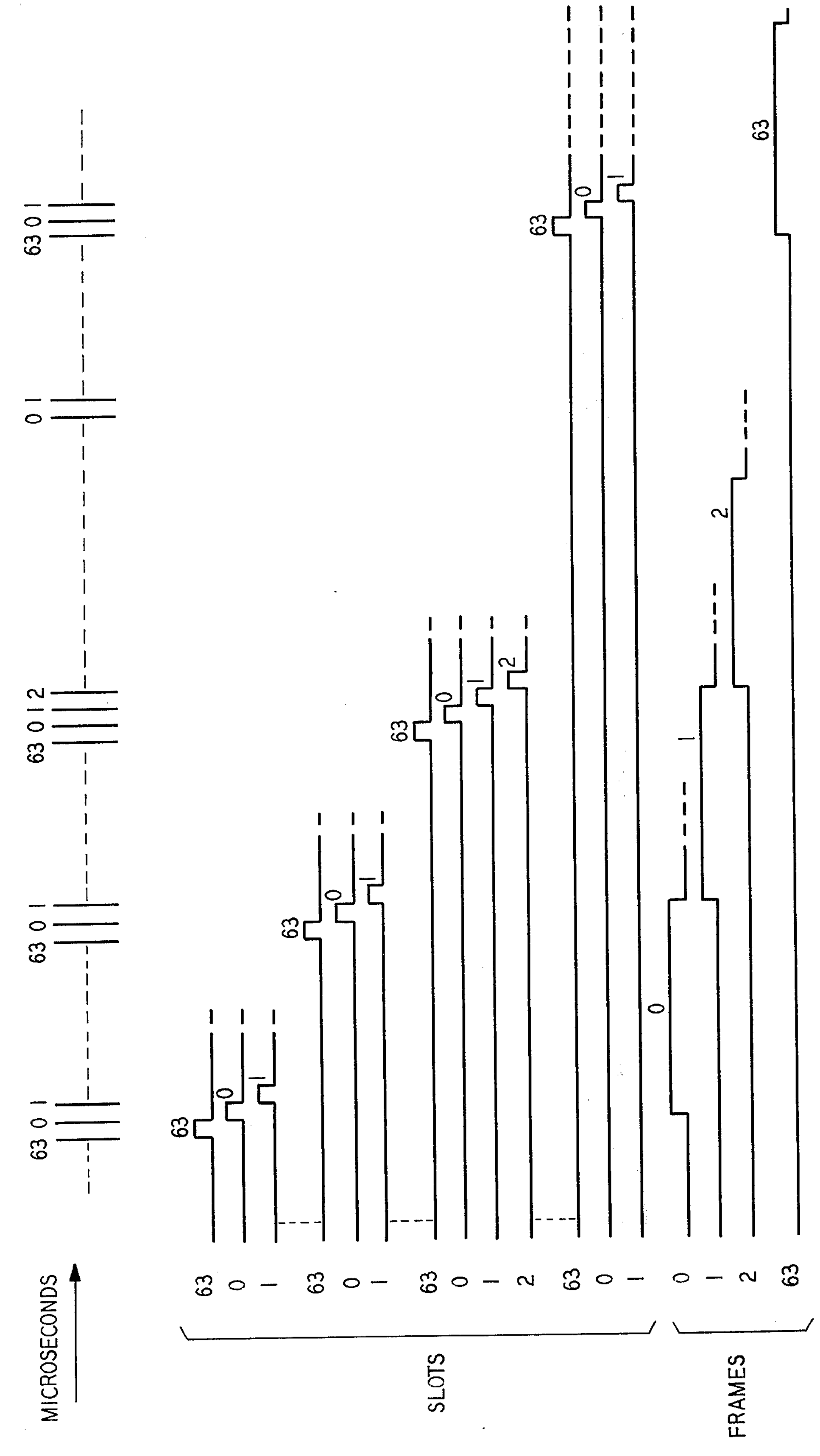
FIG. 1 and 2 are system timing diagrams that illustrate the relationship between slots and frames.
Figure 2:
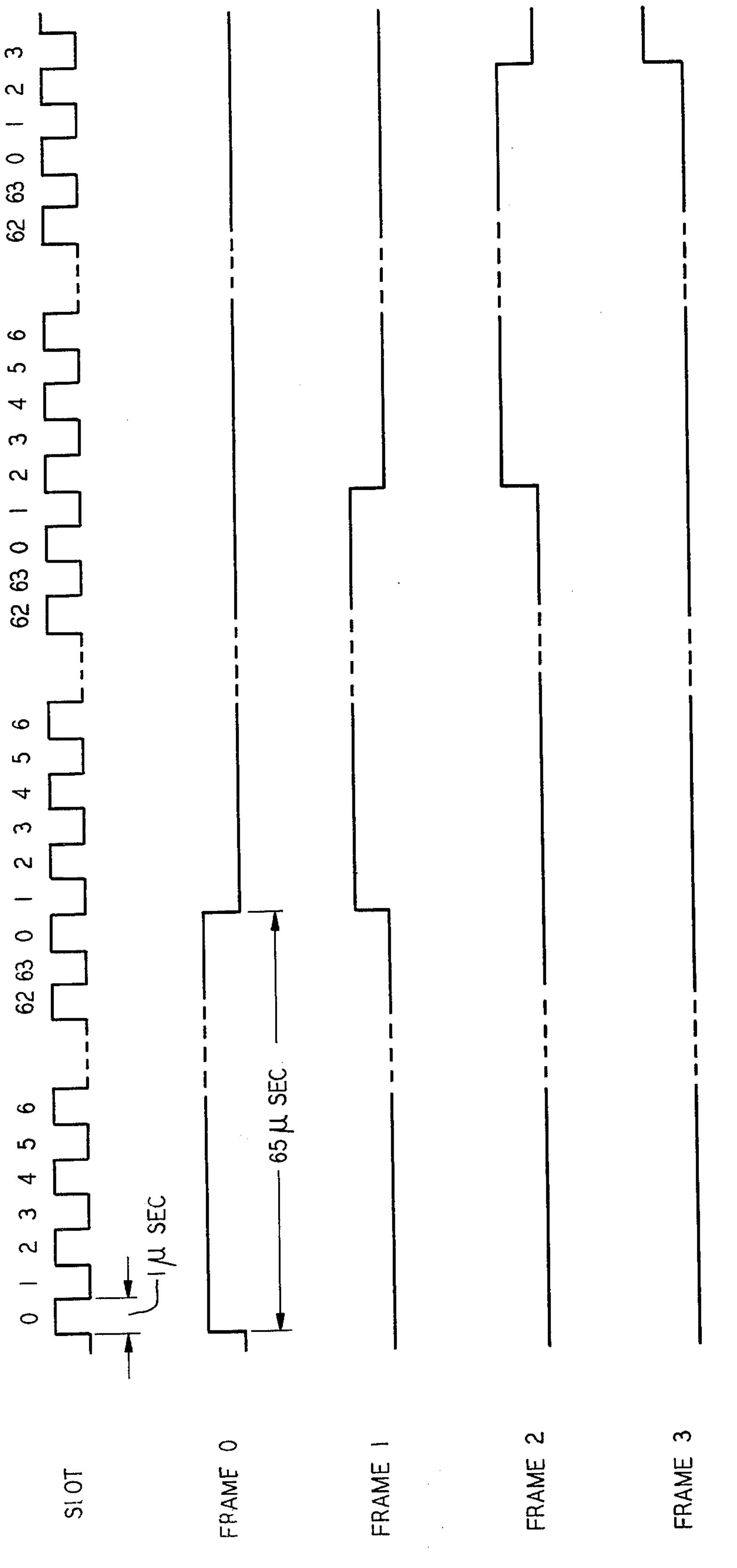

FIGS. 1 and 2 illustrate the relationship between time slots and frames as well as the manner in which the slots and the frames are arranged to form repetitively recurring groups.

The top line of FIG. 1 represents time in microseconds with the vertical lines representing each microsecond being arranged into cyclically reoccurring groups of 64 (0 . . . 63). The leftmost microsecond line is designated 63 and represents the last microsecond of a group.

The slots are positioned on FIG. 1 to indicate the duration of each slot as well as the time relationship between slots. Thus, the top slot is designated 63 and spans the interval between microsecond 63 of a first group and microsecond 0 of the next group. The next slot is designated 0 and extends from microsecond 0 to microsecond 1. The remaining slots of this group are designated 1 through 63 and each has a duration of 1 microsecond.

The bottom portion of FIG. 1 indicates a single group of frames designated 0 through 63. The first frame is designated frame 0; it has a time duration of 65 microseconds; it begins at the first indicated appearance of slot 0 and terminates with the end of the slot 0 time for the next group. The remaining frames each have a duration of 65 microseconds and each spans 65 time slots.

FIG. 2 also discloses a plurality of slots and frames, the duration of each slot and each frame, as well as the time relationship between the slots and frames. The top line of FIG. 2 discloses a plurality of groups of repetitively recurring 1 microsecond time slots. The remainder of the lines on FIG. 2 illustrate a plurality of frames including the duration of each frame, the time relationship between the various frames, as well as the time relationship between the frames and the slots. For example, the second line from the top illustrates frame 0; its 65 microsecond duration spans the time beginning with the first indicated appearance of slot 0 and terminates with the end of the next occurrence of slot 0. Frame 1 spans the 65 microsecond interval beginning with the second occurrence of slot 1 and ending with the termination of the third occurrence of slot 1.

GENERAL DESCRIPTION — FIG. 3

Figure 3:
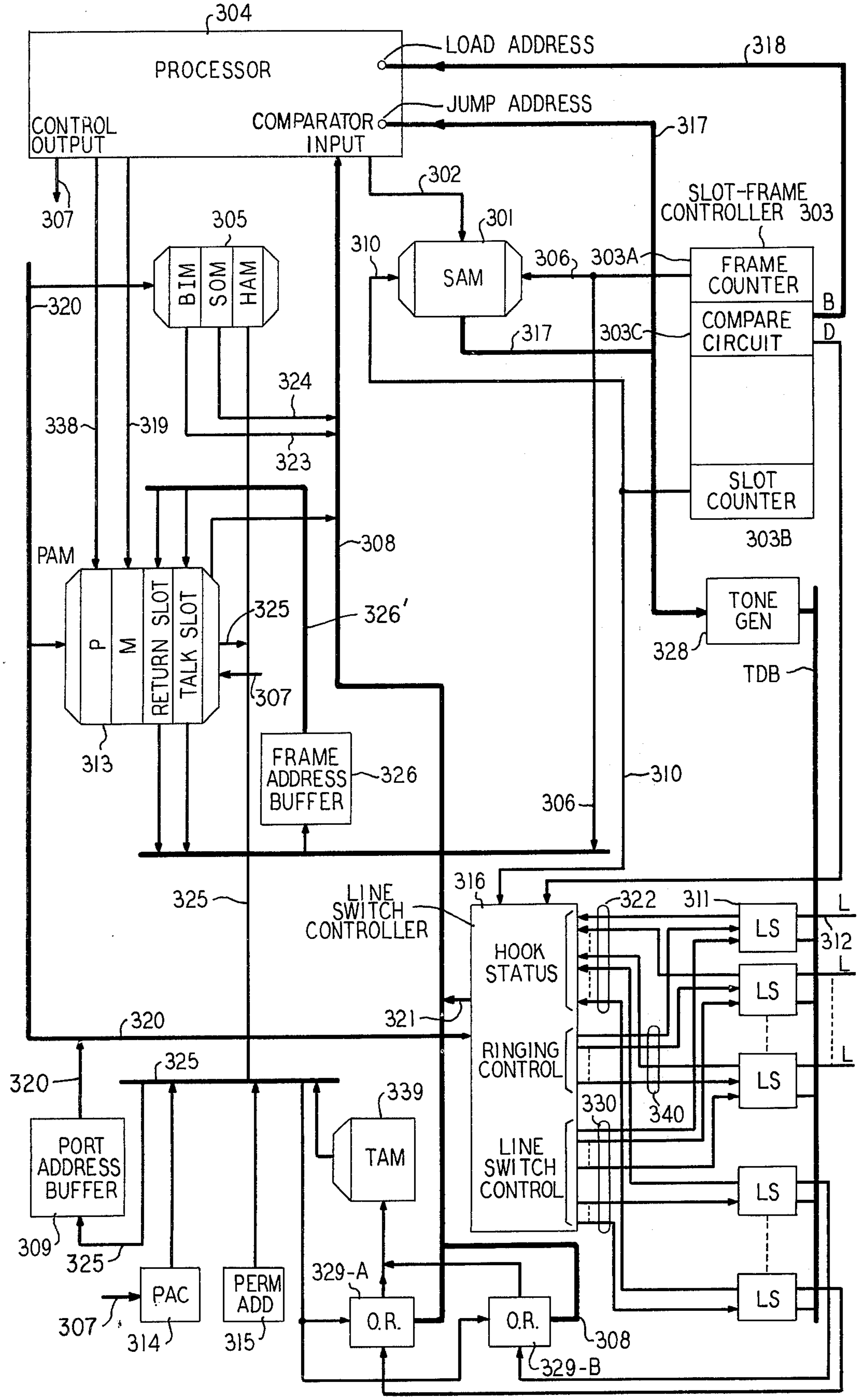
FIG. 3 discloses the invention in diagrammatic form.

FIG. 3 discloses the system of the present invention in diagrammatic form. The system basically comprises a processor 304, a plurality of hardware memories such as elements 301, 305, 313, and 315, a slot frame controller 303, a line switch controller 316, a plurality of line switches 311, and a plurality of conductor pairs 312 which extend from the line circuits to the stations. The system also includes a plurality of buses, conductors, registers 329-, together with the gates required to exchange information between the various system elements.

The slot frame controller 303 includes a frame counter 303A, a slot counter 303B, and a comparator 303C. The slot and frame counters provide outputs indicating the current time slot and frame state of the system; the comparator 303C detects a correspondence between the setting of the frame and slot counters and advances the frame counter one position upon the detection of each such correspondence.

The SAM (Slot Address Memory) memory 301 contains a word location for each slot and the contents of each such word indicate the current call status of the call assigned to the slot; if no call is assigned to a slot, its portion of memory contains an "idle" status word indicating that the slot is currently idle. The slot counter 303B applies a signal once each microsecond over its output conductor 310 to the SAM memory 301. This causes the memory to read out the status word for the indicated call slot and apply it over bus 317 to the processor 304. The reception of this status word by the processor advances the processor to the program address represented by the status word. The processor applies gating and other types of control signals to the various elements of the system under control of the program to exchange the information required for call processing.

In order to describe the operation of the system which will be discussed later in greater detail, let it be assumed that the system advances from frame 1 to frame 2 and let it also be assumed that frame 2 is currently in an idle condition and not serving a call. In this case, an "idle" status word is currently stored in the slot 2 word of the SAM memory. The slot counter 303B applies a 2 over its output conductor 310 to the left-hand input of the SAM memory which, in turn, reads out the idle status word for slot 2 from its lower output and applies it to path 317. This path extends to the JUMP ADDRESS input of the processor and the receipt of the idle status word places the processor under control of the program subroutine identified by the status word.

The function of the system upon the detection of a frame and a slot in an idle condition is to scan idle ports for service requests. For the currently described call, the processor now applies signals over path 307 to advance the PAC (Port Address Counter) counter 314 one position. This counter has a position representing each port or line circuit and this counter is used to detect service requests. When the PAC counter is incremented one position, its contents are transferred to the port address buffer 309 which receives the port address, temporarily stores it, and applies this information over bus 320 to the line switch controller 316. The receipt of this information causes the controller to interrogate the corresponding line circuit to determine its current on-/off-hook status. This information is returned over conductors 322 to the controller which, in turn, passes it via path 321 to the compare bus 308. Bus 308 extends to the processor 304 at the Compare Input where the received information advises the processor of the current supervisory state of the line circuit. If the port is idle or on-hook, the PAC counter 314 is again incremented by the processor 304 on path 307, the next port is interrogated, and information pertaining to the supervisory status of the port returned to the processor 304 over the compare bus 308. This process continues until the 65 microseconds of processing time allocated to frame 2 has expired or, alternatively, until a port is found that is in an off-hook status.

An off-hook status may represent a valid service request; it may also represent a line currently in a talking condition; it may also represent a line hit. The memory 305 and, in particular, the BIM (Busy-Idle Memory) portion of this memory, is used to determine whether a detected off-hook condition of a port represents a new service request.

The port number currently in the port address buffer 309 is now applied over path 320 to the left-hand input of the memory 305 and steered to the BIM memory by means of the processor gating signals. The receipt of this port number causes the memory to read out information indicating the current busy-idle state of the port. This information is applied over path 323 to the compare bus 308 and, in turn, to the COMPARE INPUT of the processor. If the BIM indicates that the port is busy, this means that the port is currently involved on another call in another time slot. In this case, the scanning of the ports continues under control of the PAC 314.

Alternatively, if the information received from the BIM memory indicates that the port was idle on the last scan, the current off-hook state of the port may represent a new service request. Since it may also represent a transient condition such as a hit, it cannot be definitely determined during this occurrence of frame 2 whether the current off-hook state of the port represents a valid service request. In order to assist in such a determination, a busy indication is written into the word of the BIM memory that is associated with the currently scanned port, which is assumed to be port 8.

After a busy indication for port 8 is written into the BIM memory, the processor applies signals over path 302 to erase the idle status word in the slot 2 portion of the SAM memory and in its place writes a "hook check" status word. A 2 representing frame 2 and slot 2 is written into the talk slot portion for port 8 of the PAM (Port Address-Memory) memory 313. The port 8 address information is supplied to the left input of the memory from the port address buffer 309; the 2 is supplied to the top input of the TALK SLOT portion of the memory by the frame address buffer 326 which stores the current frame number. This frame number is received by the buffer from the frame counter 303A via path 306.

This completes all of the work that can be performed for the call during this occurrence of frame 2. The comparator 303C detects the last microsecond assigned to frame 2 when both the frame and the slot counters are in their 2 position. At that time, the comparator generates output signals which perform a number of control functions included among which is to advance the frame counter one position to frame 3. The system then performs work for frame 3 and upon its conclusion performs work for subsequent frames in accordance with the call status word written in the SAM portion of memory assigned to each slot.

Subsequently, the system returns to frame 2 and the "hook check" status word currently stored in the slot 2 portion of the SAM memory is applied via path 317 to the JUMP ADDRESS input of the processor 304. This places the system under control of the hook check subroutine. On this next occurrence of frame 2, the frame number of 2 is applied to the TALK SLOT portion of the PAM 313. This causes the memory to perform a content addressable search for the identity of the port or ports currently associated with frame 2 and slot 2. This is assumed to be port 8 and, therefore, the memory performs a content addressable search and applies an 8 over path 325 to the port address buffer 309. From there, this 8 is applied over path 320 to the line switch controller 316. The receipt of this information causes the controller to determine the current supervisory status of port 8 and return information over paths 321 and 308 to the processor 304 indicating the supervisory state. If the port is on-hook at this time, the processor concludes that the prior off-hook state did not represent a valid service request. It then erases the busy indication of port 8 in the BIM memory and erases the association between port 8 and slot 2 in the TALK SLOT portion of PAM 313.

Alternatively, if port 8 is in an off-hook condition, the processor determines that this is a valid service request and it proceeds with the work functions required to connect the calling line to an originating register 329. The first function required at this time is to change the status of the slot 2 portion of the SAM memory from hook check to "register request". This is done under control of a 2 applied to the right side of the SAM memory on path 306 from the frame counter 303A and under control of the "register request" status word applied to the upper input of the memory over path 302 from the processor 304. These two items of information together write the new status word of register request in the slot 2 word of the SAM memory.

After register request is written in the SAM memory, the system performs no further work function for this occurrence of frame 2. The system subsequently performs work for other frames and slots. On the next occurrence of frame 2, the register request status word is read out of the SAM memory, received by the processor, which is then placed under control of a program subroutine which causes the system to select an idle originating register.

The system selects a register by applying a signal to the permanent address memory 315 which, in turn, applies the port number of a first register to the port address buffer 309. This port number is applied by the buffer to bus 320 which causes the controller 316 to determine the busy-idle status of the first register 329-A. If this register is idle, it is seized for use on the call. If it is busy, the port address of the next register is derived by applying the port address of the first register to the HAM (Hunting Address Memory) memory 305 and by gating out the port number of the next register over path 325 and into the port address buffer 309. In this manner, a plurality of originating registers may be tested in succession until an idle one is found.

When an idle originating register is found, this information is applied to the processor 304 over paths 321 and 308 and the processor at that time performs a write operation in the PAM memory 313 to associate the port number of the register with frame 2. This is done by applying the port number of the register to the left side of the PAM memory on path 320 from the Port Address Buffer 309, by applying the frame number of 2 from the frame address buffer 326 to the upper input of the talk slot field, and by applying the other gating signals required from path 307 to cause the memory to perform the required writing operation. At the same time the processor changes the call status word for frame 2 in the SAM memory from register request to "dial tone".

After the call is changed to the "dial tone" status, the calling party hears dial tone which is supplied to the time division bus (TDB) from tone generator 328. The tone generator is connected at its input to bus 317 which receives the call status for each call served by the system as the slot counter advances the SAM memory once each microsecond from slot to slot. The tone generator contains a plurality of tone sources and a decoder. The call status words applied as input signals to the tone generator cause it to apply the required tones to the time division bus. Thus, at the present time the receipt of the dial tone status word causes the generator to generate a dial tone and apply it to the time division bus during each occurrence of slot 2. Upon hearing dial tone, the calling customer dials the called station digits and the register assigned to the call receives and registers these digits in the customary manner. The call status in the SAM memory is changed to "dialing" when the first dial pulse is detected. This causes the tone generator 328 to remove dial tone from the time division bus during time slot 2.

A plurality of occurrences of frame 2 occur while the called number is being dialed. During each such occurrence, the processor 304 is placed under control of a "dialing" subroutine which checks the signals on bus 308 to determine whether an end of dialing signal has been received from the originating register 329 assigned to the call. If no such signal has been received, the processor 304 performs no work during the remainder of the frame 2 occurrence.

Ultimately, on a subsequent occurrence of frame 2, an end of dialing signal will be detected. At that time, the contents of the originating register 329 are gated into the TAM (Talk Address Memory) memory 339 which translates the dialed number into port address information and enters it into the port address buffer 309. The port address of the called line is then applied over bus 320 to the line switch controller 316 which tests the busy-idle status of the called line. If the line is busy, this indication is returned over paths 321 and 308 to the processor which changes the call status to the SAM memory from "dialing" to "busy". This, in turn, causes the tone generator to apply busy tone to the time division bus to advise the calling party that the called line is busy. Alternatively, if the called line is idle, its port number is associated with slot 2 by writing a 2 in the Talk Slot portion of the PAM memory for the port word of the called line. A 1 is written into the M and P fields at this time for the same port to indicate that this port is the called port.

After the called port is found to be idle, the status of the call is changed to "ringing" in the SAM memory. This causes ringing tone to be returned to the calling party from tone generator 328 and ringing current is applied to the called port from controller 316.

After the called line answers, the call status is changed to "talk" in the SAM memory and the two parties are effectively interconnected during each occurrence of time slot 2. This is done under control of the line switch controller which causes the line switches for the calling and called ports to be closed during each occurrence of slot 2. The controller 316 receives the slot number information over path 310 from the slot counter and uses this information to close the line switches for the ports assigned to a call. The controller 316 contains a content addressable memory that is analogous to the PAM memory 316 and which stores information indicating the current association of each port with a slot. When a port is to be assigned to a slot such as, for example, when the calling port 8 is assigned to slot 2, the port number is applied to the controller via bus 320 and the slot number of 2 is applied to the controller over path 310. By means of the appropriate strobe and gating signals from the processor, the content addressable memory within the controller associates slot 2 with port 8. Similarly, when the called port is found to be idle, its port number is applied over bus 320 to the controller and written into the memory under control of the slot number of 2 received over path 310 from the slot counter. On each subsequent occurrence of slot 2, the receipt of the slot number by the controller causes its memory to perform a content addressable search to identify all ports associated with slot 2. Each port is associated with one of the conductors 330. During each slot time an output potential is applied to each conductor currently associated with the slot to activate its line switch. By this mechanism, the line switches for the call served during the time slot 2 are closed, connected to the time division bus, and thus connected to each other. The association of the register port with slot 2 is removed and its BIM word is marked idle when the call is answered by writing a 0 in the talk slot field of the port in the PAM memory.

After the two stations are connected, the system performs a content addressable search on the PAM memory on each subsequent occurrence of frame 2 in order to determine the current supervisory status of each port assigned to the call. This is done by gating the frame number of 2 from the frame address buffer 326 to the top input of the PAM memory on path 326' which enters the calling and called port numbers into the port address buffer sequentially. As each such number is entered into the buffer, is causes the controller 316 to test the state of the line associated with the port and the state information is returned to the processor via paths 321 and 308. The call continues as long as both ports are off-hook on each frame occurrence. The on-hook condition of one or both of the ports is detected when one or both parties abandon the call. This is reported back to the processor, which then initializes the memories by a write operation to remove the association between frame 2 or slot 2 and any of the ports.

DETAILED DESCRIPTION — FIGS. 4, 5, AND 6

Figures 4, 7:
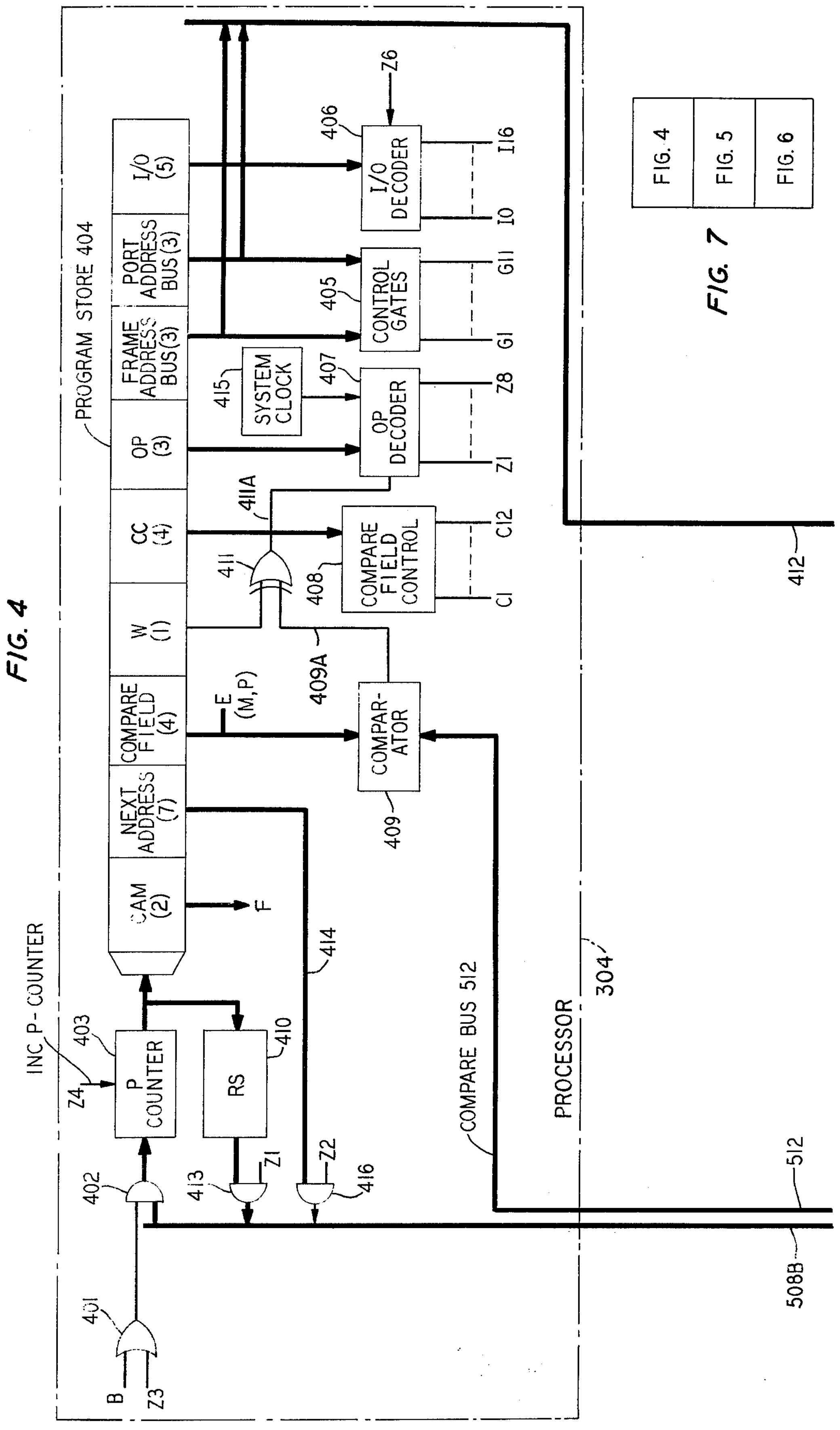
FIG. 4, 5, and 6, when arranged as shown in FIG. 7, illustrate further details of the invention.
Figure 5:
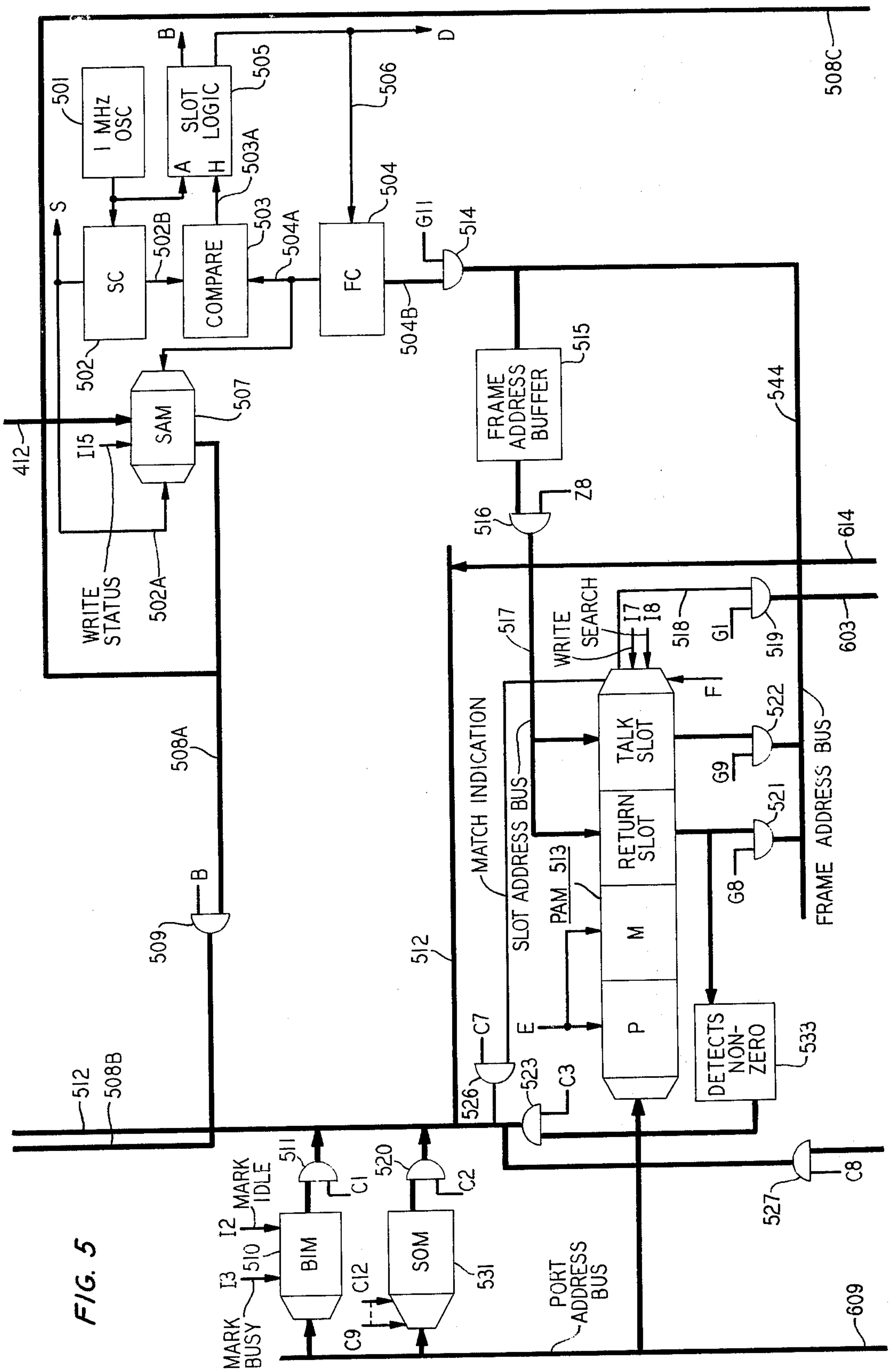
Figure 6:
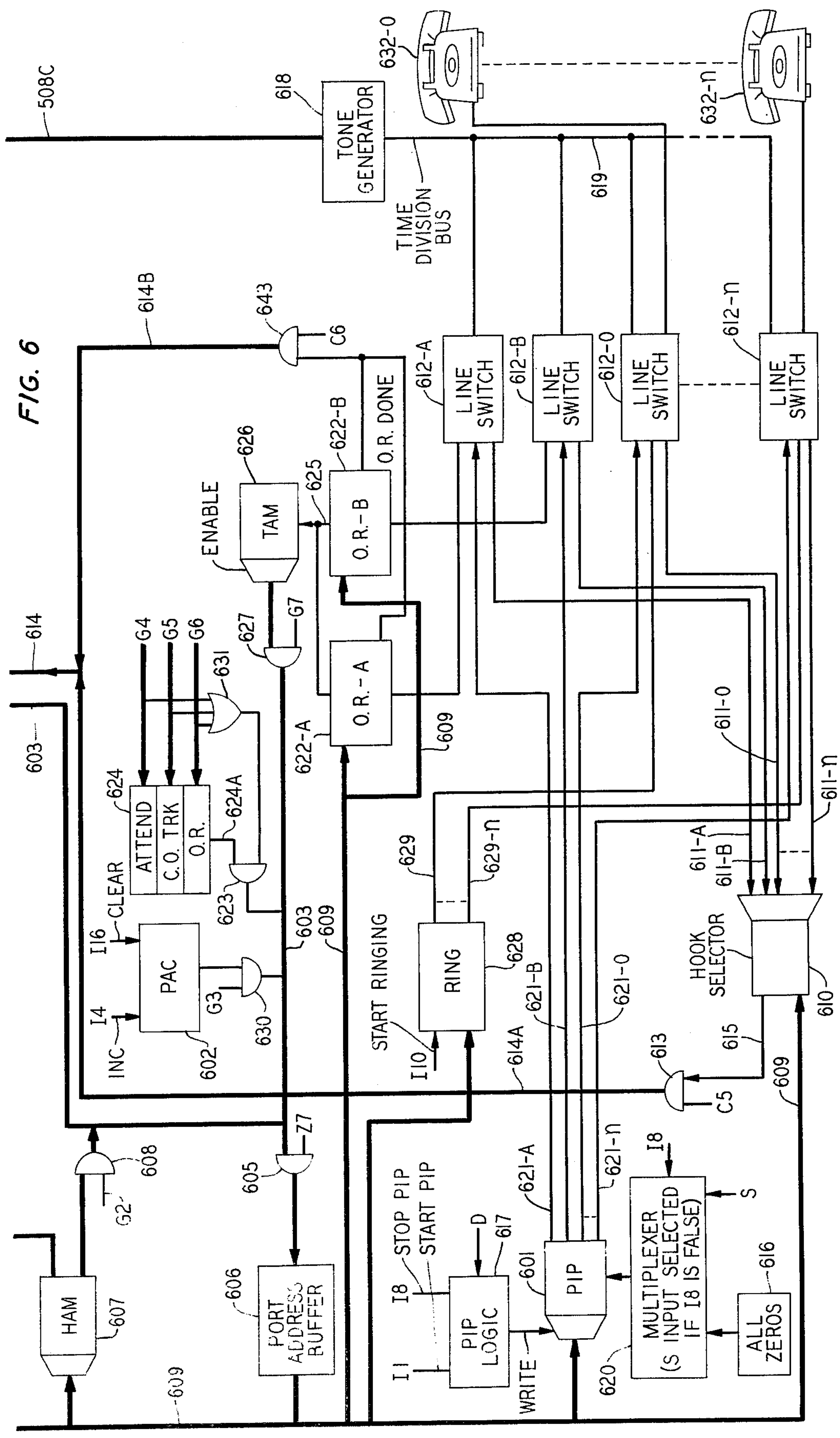

FIGS. 4, 5, and 6, when arranged as shown on FIG. 7, disclose further details of the system comprising our invention. FIG. 4 for the most part discloses the details of the processor including the program store together with the decoders and gates associated with the memory. FIG. 4 additionally discloses the comparator which performs the processor's logic operations. FIGS. 5 and 6 disclose the remainder of the system including the hardware memories as well as the circuitry that interchanges information between the memories. The lower right-hand corner of FIG. 6 discloses the time division bus 619, the line switches 612- connected to the time division bus, as well as the telephones 632- connected to the line switches.

The rate at which the system operations are performed is controlled by the one megahertz oscillator 501 of conventional design. This oscillator drives the slot counter (SC) 502 which has 64 counting positions designated 0 through 63 and which advances one position for every cycle of oscillator 501. Counter 502 is of the binary type and the current position of the counter represents the slot currently being served by the system. Counter 502 provides an output over path 502A to the left input of the slot address memory (SAM) 507. Counter 502 also provides an output indicating its current setting over path 502B to the compare circuit 503.

The frame address counter 504 (FC) is advanced once every 65 microseconds as subsequently described and indicates the current frame count, i.e., the slot whose call information is currently being processed. Counter 504 is also of the binary type and has 64 positions designated 0 through 63. The current setting of counter 504 is applied over conductor 504A to the compare circuit 503 and is applied over path 504B to one input of gate 514. The compare circuit 503 applies an output to path 503A when the setting of slot counter 502 matches that of frame counter 504. The output signal on path 503A is applied to the slot logic circuit 505 which, by means subsequently described, performs a number of functions one of which is to advance counter 504 one position upon each occurrence of a new frame. The compare circuit 503 can be any conventional comparator as discussed for example, at page 99 in Mano, "Computer Logic Design" published by Prentice-Hall (1972).

The description of the system operation begins with the assumption that the system is currently processing a call for slot 1 and that the frame counter 504 is, therefore, currently indicating a count of 1. This 1 is applied over path 504A to the compare circuit 503.

The function of the compare circuit is to determine whenever the slot counter 502 is in the same position as the frame counter 504. Whenever this condition is detected, the comparator applies a signal over conductor 503A to the H input of the slot logic circuit 505. The D output of the slot logic circuit 505 provides a 1 microsecond delay with respect to the H input. After this 1 microsecond delay, a pulse is applied from the D output to the right input of the frame counter 504 on path 506 to increment it one position.

As already mentioned, it is assumed that the frame counter 504 is in position 1, that slot counter 502 advances to its position 1, and that the compare circuit 503 detects that both counters are currently in their position 1. On FIG. 2 this condition is represented by the third slot designated 1 on the upper line; and at the beginning of this occurrence of slot 1 the system is in its frame 1 condition as indicated by the timing diagram for frame 1. The compare circuit 503 generates an output pulse upon the beginning of this occurrence of slot 1 and applies this pulse to the slot logic circuit 505. After a delay of 1 microsecond, the slot logic circuit generates a pulse that advances counter FC one position to its position 2. This places the system in its frame 2 condition in which it can process calls assigned to slot 2 or can perform other work in the event that a call is not currently assigned to slot 2.

The oscillator 501 increments the slot counter 502 one position and advances it to its position 2 at the same time that the output of the slot logic circuit increments the frame counter 504 to its position 2. This condition is represented on FIG. 2 by the penultimate slot designated 2. From an inspection of FIG. 2 it can be seen that the beginning of this slot coincides with the beginning of frame 2. The upper output of the slot counter 502, which now contains a 2, is applied over path 502A to the left input of the SAM memory element 507. SAM is a random access memory which has a word location for each slot. The memory responds to the receipt of slot information on its left input and applies the current contents of the slot 2 word to bus 508A.

As is subsequently described, the current contents of the SAM memory for each slot represents the current status of the call being served during the time slot. Thus, the contents of the word 2 of memory 507 indicate the current status of the call being served during the slot 2 time. In response to the receipt of a 2 on its left input 502A, the memory 507 applies information in coded form to bus 508A representing the current status of the call served by slot 2. This information is hereinafter referred to as the call status word or the call status.

The call status word applied to bus 508A is extended through AND gate 509 under control of the B output of the slot logic circuit 505 and from there is applied over bus 508B to the lower input of gate 402. The B pulse on the input of OR gate 401 passes through this gate and is applied at this time to the upper input of gate 402 where it causes the information on bus 508B to pass through gate 402 and be entered into the Program (P) counter 403. The P counter comprises the address counter for the program store 404. The P counter 403 may comprise any of several conventional binary counters capable of incrementation such as those disclosed at page 188 in Mano, supra. The program store comprises a plurality of system subroutines, wherein the address in memory of the first word of each subroutine is a call status word. Conversely, there is a program subroutine for each possible call status of the system. The setting of the P counter 403 to the current call status for slot 2 constitutes a command to the program store to advance to the address of the subroutine associated with the call status. The execution of a program causes information signals to be applied from the various fields of the program store to the conductors that extend downward from the various indicated segments of the memory.

Let it be assumed that the current call status of slot 2 is idle thereby indicating that slot 2 is not currently serving a call. This being the case, the status word of idle is entered into the P counter over bus 508B and via gates 509 and 402 as already described. The idle status word actually constitutes the beginning address of a series of words in the program store which words constitute the idle program subroutine for the system. This subroutine causes the system to perform the work functions associated with an idle time slot. One of these functions is the scanning of idle ports (line switches 612) to determine the identity of a station requesting service. This function is performed under the control of the port address counter (PAC) circuit 602 on FIG. 6.

The PAC counter has a position for every port 612 on the time division bus 619. The current setting of the counter when an idle slot is encountered represents the address of the port that was scanned during the processing of the last idle time slot. The PAC counter receives control I4 and I16 signals from the I/O decoder 406 on FIG. 4 which may be any conventional binary decoder (see Mano, supra at page 108) responding to a binary address field with a one-out-of-n control activation. In the preferred embodiment, a five-bit binary field is decoded into 16 signals. A signal is received over conductor I–and increments the PAC counter one position; a signal received over conductor I16 clears the PAC counter. The I/O decoder 406 now applies a pulse to conductor I4 to increment the PAC one step in preparation for the scanning of the next port. Let it be assumed that the PAC was initially at a count of 7 and is incremented by the I/O decoder to a count of 8 corresponding respectively, to port 7 and port 8.

The contents of the PAC are now transferred in parallel via AND gates 630 and 605 to the port address buffer 606 which comprises a set of flip-flops. This transfer is effected by means of a pulse applied to the G3 input of AND gate 630 from control gates 405 and by a Z7 pulse applied to AND gates 605 by the OP decoder 407.

The 8 stored in the port address buffer 606 is next transferred over bus 609 to the hook selector circuit 610. The hook selector 610 comprises a multiplexer which effectively connects its output 615 to the one of its input conductors 611- specified by the port address information on path 609. Each conductor 611- extends between the hook selector 610 and one of the line switches 612-. Each line switch continuously applies a signal to its 611- conductor indicating whether it is currently busy or idle. In response to the receipt of a port 8 address on path 609, the hook selector 610 applies a signal representing the state of line 8 to its output 615. This signal is extended through AND gate 613 which extends via path 614A to the compare bus 512. Bus 512 extends from FIG. 5 to the input of the comparator 409 on FIG. 4. The comparator 409 receives the signal transmitted from the hook selector and, in a manner subsequently described, operates under control of information received from the COMPARE FIELD of the program store 404 to control the additional system operations required at this time.

Let it be assumed that an off-hook signal for port 8 is received by the hook selector and applied to comparator 409. The comparator 409 may comprise any conventional comparator of the type referenced for the compare circuit 503. The comparator compares the signal received from the hook selector with signals received from the COMPARE FIELD of the program store and applies to gate 411 of FIG. 4 over path 409A a signal indicating whether or not a comparison is detected. The other input of the exclusive OR gate 411 is connected to the W field of the program store 404 and, as subsequently described in detail, the signal received from the W field together with the signal received from the comparator field permits the system to determine whether or not the signal received from the hook selector represents an on-hook or off-hook condition. The output 411A of gate 411 is connected to the OP decoder 407 to permit it, together with the information in the OP field of the program store, to control the potentials applied to conductors Z1 through Z8. The OP decoder 407 is a conventional one-out-of-n decoder being driven by the system clock 407 and being activated by lead 411A.

The compare bus 512 is connected to many different circuit elements of the system. The time and the order in which these various elements apply output information to the bus is determined by the compare field control 408. The compare field control 408 is a conventional one-out-of-n decoder of the type described for the I/O decoder 406. This control 408 has a number of outputs designated C1 through C12, each of which is connected to a different system element. The order in which the C- outputs are activated is determined by the program as it advances from word to word of the subroutine currently controlling it.

At this time the compare field control 408 applies a signal to its conductor C1 to activate the BIM (busy/i-dle memory) element 510. The input of the BIM is currently receiving an 8 as an indication of port 8 from the port address buffer 606. In response to the C1 pulse from the compare field control, gate 511 is enabled to apply the current contents of word 8 of the BIM to indicate whether port 8 was busy or idle on a prior scan. This information is received by the comparator which, in a manner analogous to the hook status determination, determines whether port 8 was busy or idle on the prior scan.

Let it be assumed that port 8 was idle on its prior scan and that this information is applied to the compare bus 512 from memory BIM via gate 511. It has also been assumed that the current state of port 8 from the hook selector indicates an off-hook condition. This current off-hook condition can represent a new service request; alternatively, it can represent a line hit or a noise signal.

The following describes the manner in which the system determines whether the current state of port 8 represents a valid service request. It should be remembered that the processing time available for this occurrence of frame 2 is only 65 microseconds; it should also be remembered that it typically requires a minimum of 4 milliseconds to determine whether an off-hook state of a port is a valid service request rather than a line hit or noise condition. Therefore, this determination cannot be made during this 65 microsecond occurrence of frame 2.

In partial summary, it has been stated that the slot 2 portion of the SAM memory 507 currently contains an idle call status word thereby indicating that slot 2 of the system is not currently serving a call. For this occurrence of frame 2, it has been described how the ports are scanned under control of the PAC counter 602; it has further been assumed that the scanning port 8 indicated that the port was off-hook and that this off-hook condition may possibly represent a new service request. This being the case, it is now necessary to change the call status word for slot 2 of the SAM memory 507 from idle to hook check. The various call status words in the SAM memory actually comprise various combinations of binary bits. However, it is convenient to refer to each such combination of bits as the call condition represented by the combination.

The frame counter 504 currently is in a count of 2 in which it now applies an output signal representing a 2 over conductor 504A to the right-hand input of the SAM memory 507. The right-hand input of this memory is used to control the addressing for a write operation into the memory. The left-hand input, 502A which is connected to the output of the slot counter 502, controls the addressing for a readout of the memory. With an address of 2 applied to its right-hand input for a write operation, the program store 404 and I/O decoder 406 now generates a signal on conductor I15 and apply it to an upper input of the SAM memory. The combination of binary bits that represents the word hook check is applied to the bus 412 by the FRAME ADDRESS and PORT ADDRESS portions of the program store 404. These two fields normally control the gates 405 to generate the signals that are applied to conductors G1 through G11. The control gates 405 comprise a conventional one-out-of-n decoder of the type described for the I/O decoder 406. However, at this time the information in these two fields represents the new status word that is to be written into the SAM memory. The new status word of hook check is now applied from these two fields together and over bus 412 to the upper input of the memory to write a hook check into the slot 2.

The hook check word actually comprises the binary address of the first word of a hook check subroutine in the program store 404. The hook check subroutine causes the system to perform the word functions required of a call in the hook check status. A call is in the hook check status from the time a possible off-hook service request is detected until the time the system determines whether or not the off-hook represents a valid service request.

The following describes how the system relates port 8 to slot 2 or, in other words, now the system stores information indicating that slot 2 is serving a call associated with port 8. Information indicating this relationship is stored by the PAM (port address memory) 513 which contains a word for each port. On its left input, the memory currently receives an 8 from the port address buffer 606. The processor now writes a 2 representing frame 2 into the TALK SLOT field of the port 8 word. The processor now writes a 2 representing frame 2 into the TALK SLOT field of the port 8 word. The 2 originates in the frame counter 504. It is propogated through gate 514 by a G11 signal and is entered into the frame address buffer 515. This buffer essentially comprises a set of flip-flops which stores the current frame count. Subsequently, at a time determined by the processor 304, the frame count of 2 is gated from the frame address buffer 515 through gate 516 by a 28 signal, is applied over bus 517, and entered into the talk slot field of the port 8 word. This 2 is gated into the talk slot field under control of a write signal on conductor 17 from the I/O decoder 406.

After the program writes a frame count of 2 into the PAM Talk Slot field, a busy mark is written into the BIM memory 610 to indicate that port 8 is currently busy. This is accomplished by applying the port 8 address on bus 609 to the left side of the BIM memory and by writing a busy mark into the port 8 word portion of this memory under control of a signal on conductor I3 from the I/O decoder 406. The purpose of entering a busy mark onto the 510 memory is to ensure that no other time slot will attempt to pick up or serve port 8.

At this time it is necessary that a 2 be written into the appropriate portion of the PIP memory 601. The function of this memory is to control the line switches 612- so that each line switch involved on a call is turned on and connected to the time division bus 619 during the time slot assigned to the call. For the call now being described, it is assumed that it is assigned to slot 2; it is, therefore, necessary that a 2 be written into the port 8 portion of the PIP memory. This is accomplished in the following manner. A 2 is applied to the S input of the multiplexor 620; this 2 passes through the multiplexer to the lower input of the PIP memory unless it is inhibited by an I8 signal from the I/O decoder 406 which is not present at this time. An 8 from the port address buffer 606 is currently applied to the left input of the PIP memory via bus 609. At an appropriate time during the frame, a signal on the I1 input of the PIP logic circuit 617 sets a flip-flop; subsequently, during the last microsecond of frame 2 when both the slot counter and the frame counter are at a count of 2, the comparison circuit 503 generates a signal on its D output and applies this D signal to the right-hand input of the PIP logic circuit 617. This D signal together with the prior setting of the flip-flop applies a write signal to the PIP memory 601 to write a 2 in the port 8 word. As is subsequently described in detail, during each subsequent occurrence of slot 2, a 2 on the S input of multiplexer 620 is applied to the lower input of the PIP memory to cause it to perform a content addressable search to determine all ports currently associated with slot 7. As a result of this search, the memory applies a signal to its 621- output conductors that are connected to line switches currently serving calls assigned to slot 2. This signal activates each such switch and connects it to the time division bus during the slot 2 time.

The writing of a 2 in the port 8 portion of the PIP memory 601 functionally associates port 8 with slot 2 so that the line switch associated with port 2, namely line switch 612-8, will be connected to the time division bus on each slot 2 time.

It has just been described how a 2 representing time slot 2 is written into the port 8 portion of the PIP memory and how this was done during the last microsecond of the 65 microseconds comprising this occurrence of frame 2. The system now leaves frame 2 and goes on to perform work for other time slots. In so doing, the frame counter advances to 3 and the system performs any work required of a call currently being served during the slot 3 time. The slot counter 502 is the controlling mechanism that determines the end of the frame time since it makes a complete cycle each frame time and during the 65th microsecond of a frame, the comparison circuit 303 detects a match between the slot counter and the frame counter and moves the system to the next frame.

After leaving frame 2, the system performs work for all frames subsequent to 2 and then performs work for frames 0 and 1. At the end of the frame 1 time and when the slot counter 502 is in its position 1, the compare circuit 503 receives a 1 on both its upper and lower inputs and after one microsecond the slot logic circuit 505 advances the frame counter 505 one step to its position 2. It also applies a pulse to its output B. By the time the B output of the slot logic circuit 505 is generated, the slot counter 502 has advanced to position 2 from its position 1 and the D output of the slot logic circuit has advanced the frame counter to its position 2. The 2 from the slot counter is now applied to the left-hand input of the SAM memory 507. This causes the memory to apply the current status word of slot 2 to bus 508A. The B output of the slot logic circuit activates gate 509 so that the status word is applied via bus 508B to the lower input of gate 402. The upper input of gate 402 is activated at this time by the B pulse applied to gate 401. The activation of gate 402 enters the status word of slot 2 into the P counter 403. The current status word of slot 2 is hook check with the binary bits of this word representing the address of the first word of the hook check subroutine is program store 404.

A 2 from the frame counter 504 is applied to bus 504B, through gate 514 under control of the G11 signal from control gates 405, and is entered into the frame address buffer 515. From there, the 2 is applied via gate 516 under control of the Z8 signal from the OP decoder 407 to the top of the TALK SLOT field of the PAM memory 513. At the same time, an I8 signal from the I/O decoder 406 is applied to the right-hand input of this memory. This causes the memory to perform a content addressable search to determine the port memory word currently containing a 2. It has been assumed that port 8 is associated with slot 2. Therefore, during this content addressable search, the memory determines that the TALK SLOT field of port 8 contains a 2. Memory 513 now applies the port member over its output conductor 518 to gate 519. The member which is 8 for this example is passed through gate 519 under control of the G1 signal from the control gates 405 and applied to bus 603. From there, it is applied through gate 605 under control of the Z7 signal and entered in port address buffer 606.

After the 8 is entered into the port address buffer, it is applied downward over bus 609 to hook selector 610. The hook selector, in turn, applies a signal to its output conductor 615 indicating the current on-off hook state of the line switch for port B. This supervisory status signal is extended through gate 613 under control of the C5 signal and applied to bus 614A and, in turn, to the compare bus 512 which extends to the comparator 409.

If port 8 is on-hook, the program store 404 in processor 304 would respond to the on-hook signal and write an idle for the status word in the slot 2 portion of SAM memory 507. It would also write an idle in the BIM memory 510 to indicate that port 8 is idle; it would also remove the frame 2 indication from the port 8 portion of the TALK SLOT field of PAM memory 513.

Let it be assumed that port 8 is still off-hook. This information is received by the comparator 409 and used with that received from the hook check subroutine to determine that the state of port 8 represents a valid service request. The disclosed system oeprates on the assumption that two successive off-hook indications 4 milliseconds apart (two successive appearances of the same frame) represents a valid service request.

After it has been determined that this is a valid service request, the system writes the new status word of register request into the slot 2 portion of the SAM memory 507. This is done by applying the register request status word to the upper input of the memory over patch 412, by applying an I15 signal from the I/O decoder 406 to the memory, and by applying a 2 to the right side of the memory from the frame counter 504. The register request program controls the system operations required to connect an originating register to the call.

On the next occurrence of frame 2, the register request status word is read out of the SAM memory and entered into the P counter 403. This places the register request subroutine in control of the system. The originating registers are shown and are designated 622-A and 622-B. An originating register is connected to the time division bus 619 by entering into the port address buffer 606 the port address of an idle originating register. This address information is obtained from memory element 624 which receives a G6 signal from control gate 405 and extends the address of a first register through gate 623 to bus 603. From bus 603, this information is gated into the port address buffer 606 under control of gate 605 and a Z7 signal. The left-hand output of the port address buffer applies to bus 609 and the PIP memory 601 the port address of the originating register to partially enable it. Subsequently, when the slot counter 502 is again in a position 2, a 2 is written via multiplexer 620 into the port word of the PIP 601 that is associated with the selected register. This 2 is written into this port address word in the same manner that the 2 was written into the port address of 8 associated with the calling line. Let it be assumed that the address of port A for register 622-A is written.

The processor 304 writes a new status word of dial tone into the slot 2 portion of the SAM memory 507 after the register is selected. Dial tone is then applied to the line by the tone generator 618 during each slot 2 time. The tone generator 618 generates the various types of service tones required by the system such as, for example, ringing, dial tone, busy tone, etc. The type of tone that is generated is controlled by the input signals applied to the generator from the 508C portion of bus 508. Bus 508C is a part of bus 508 which receives the output of the SAM memory. During each occurrence of a slot, the SAM memory applied the status word indicating the current condition of the slot to bus 508A. A dial tone status word is applied to bus 508A during each occurrence of a slot serving a call that is currently is a dial tone status. During each such occurrence, the binary digits of the dial tone status word are applied to the input of the tone generator 618. These digits comprise address information and for the one microsecond interval of the slot, they cause the generator to apply a dial tone signal to the time division bus 619. Only line switch 8 is closed under control of the PIP circuit 601 during the slot 2 time and, thus, only the phone of the calling subscriber at station 8 is connected to the time division bus and can hear dial tone at this time.

In summary, the SAM memory 507 is advanced one position each microsecond under control of slot counter 502 and during each microsecond interval, the memory applies to bus 508 the current status word for the slot specified by the setting of counter 502. Bus 508 is connected to the tone generator and the tone generator has logic circuitry which causes it to generate and apply to the time division bus the type of service tone required by the status word on bus 508, provided that the status word requires the application of a tone to the bus. Thus, for the current call, which is served during the frame 2 and slot 2 time, this call is currently in a dial tone status and a dial tone status word is applied to the bus each time the slot counter 502 assumes its position 2. At such time, the tone generator receives the dial tone status word and applies a dial tone to bus 619 for the 1 microsecond interval associated with each such occurrence of slot 2.

Port 8 for the calling line and port "A" for the register are connected to the time division bus during the slot 2 time under control of the 2 generated by the slot counter and applied via the multiplexer to the lower input of the PIP memory 601. This causes the memory to perform a content addressable search and apply a signal to each output conductor 621- associated with the port word in which a 2 is currently written. Since a 2 is currently written in port words 8 and A, conductors 621-B and 621-A are activated, and apply a signal to line switch 8 to energize it and connect it to the time division bus during each occurrence of slot 2. This causes the subscriber at station 8 to hear the dial tone applied to the time division bus during the slot 2 time. It also connects the calling line to the originating register 622A.

The system next leaves this occurrence of frame 2 and goes on to perform the required work functions for calls assigned to other slots and frames.

Near the end of the next occurrence of frame 1, compare circuit 503 produces a match indication at its output when both the frame counter and the slot counter are in their position 1. 1 microsecond later, the slot counter advances to position 2; the slot logic circuit 505 produces an output that increments the frame counter to its position 2 and applies a signal to its conductor B to enter the status word currently on bus 508 into the P counter 403. The status word currently on bus 508 is a dial tone status for slot 2 since the signal now applied to the left side of the SAM memory is a 2 from the slot counter. At the same time, the output of the slot counter applies an S signal indicating a count of 2 to conductor S which is extended through multiplexer 620 to the lower input of the PIP memory 601. This 2 performs a content addressable search within the memory to cause the memory to apply a signal to all of its output conductors that have a 2 in their associated port memory word. Since line switch 8 and originating register A are associated with this call, a 2 has been priorly written into the port memory words of memory associated with these ports. Therefore, at this time, the 621- output conductors for these ports are activated to close their switches 612-A and 612-8 to interconnect register A with the calling subscriber. The calling subscriber hears dial tone at this time since the input of the tone generator 618 receives the dial tone status word appearing on bus 508C and, in response thereto, applies dial tone to the time division bus. Also, at this time the dial tone status word in the P counter moves the program store 404 to the first word of the dial tone subroutine.

With the frame counter 504 in its position 2, information representing the count of 2 is applied through gates 514 to the frame address buffer 515 and from there through gates 516 over conductor 517 to the upper input of the TALK SLOT field of the PAM memory 513. This signal, together with the I8 signal, causes the memory to generate a content addressable search to identify the line circuit port associated with the time slot 2. Since this is port 8 for the currently described call, the output of the memory applies an 8 to the input of gate 519, over path 603, through gate 605, to the port address buffer 606. From there, the port address information is applied to the input of the hook selector 610 which returns a signal indicating the current status of line circuit 8. Let it be assumed that port 8 is still off-hook. This information is applied via gate 613, path 614, and bus 512 to the comparator 409. This permits the processor 304 and the program store 404 to determine that line circuit 8 is still in an off-hook status. In other words, the calling party has not yet started to dial. The system in this case performs no further work for the remainder of this occurrence of frame 2; the system next leaves frame 2 and performs work for other frames. The condition just described persists as long as the subscriber remains off-hook and does not initiate dialing.

Ultimately, the subscriber will initiate dialing and in a successive occurrence of frame 2 an on-hook signal will be received by the program from the hook selector 610 by means of the circuit actions already described.

The first function the system performs when dialing is detected is to remove dial tone from the time division bus during the next occurrence of slot 2. This is accomplished by changing the status word for slot 2 from dial tone to dialing within the SAM memory. The frame counter 504 is currently applying a 2 to the right-hand input of the SAM memory 507. The program store 404 now applies the new status word of dialing to path 412 and applies an I15 signal to the upper input of the SAM memory. The 2 from the frame counter, the I15 signal, and the dialing status word from the program store, together causes a write operation to be performed within the SAM memory 507 to enter the new status word of dialing into the word 2 portion of the memory. After this status word is entered into the SAM memory, the dial tone signal is removed from the time division bus by the tone generator 618 since the binary bits representing the dialing status word do not cause the tone generator to apply any signal to the time division bus. During each occurrence of the time 2 slot while the system is in the dialing status, the reception of a 2 by the PIP memory 601 causes it to produce a content addressable search and activate all line switches associated with slot 2. For the current call, it is assumed that line switch 612-A for register A and the line switch for station 8 are activated. This connects the calling party at station 8 to originating register 622-A during each occurrence of slot 2 and permits the calling party to dial the called digits into the originating register.

Insofar as the remainder of the system is concerned, the only work function that occurs during each slot 2 and frame 2 time is to examine the output of originating register A that is applied via gate 643 and path 614 B to the compare bus 512. This signal permits the program store 404 to determine whether the calling party is still dialing or, alternatively, whether an end of dialing condition has been encountered by the register. If dialing is still in progress, the program performs no additional work during frame 2. Finally, the originating register 622-A applies an end of dialing signal to gate 643. This signal is transmitted over buses 614 and 512 to the processor 304 to indicate to the program store 404 that dialing has ended. At the same time, the originating register applies the digits representing the dialed number to output conductor 625 which extends to the lower input of the TAM (Talk Address Memory) memory 626. This memory contains information relating dialed numbers to port numbers. The receipt of the dialed number from the originating register causes the memory 626 to perform a content addressable search and generate an output signal that identifies the port number associated with the dialed number. This port number is applied through gate 627 under control of a G7 signal, applied to bus 603, extended through gate 605 under control of a Z7 signal, and entered into the port address buffer 606. This port number, in turn, is applied to bus 609 and extended to the input of the hook selector 610. This causes the hook selector to return a signal via gate 613 and buses 614 and 512 indicating whether the called port is busy or idle.

The originating register is not released from the call by writing a 0 in its port word of the PIP memory. This disconnects its line switch from the time division bus.

Let it first be assumed that the called port is busy. In this case, the program store 404 causes the busy status word to be written into the slot 2 portion of the SAM memory 507. Subsequently, the busy status word is applied from the memory and over bus 508A to the tone generator during each occurrence of slot 2. The receipt of this status word causes the tone generator 618 to apply a busy tone to the time division bus during each occurrence of slot 2. This permits the calling party to hear busy tone as an indication that the called station is busy. The system remains in this condition during each occurrence of slot 2 and the calling party continues to hear busy tone until he hangs up and abandons the call.

During each successive occurrence of frame 2, the program store 404 reads the calling port number out of the PAM memory and enters it into the port address buffer 606 which, in turn, controls the hook selector 610 and causes it to return a signal to the program store 404 indicating the current status of the calling port. By this means, the program determines whether the calling party is still off-hook and should continue to receive busy tone or, alternatively, determines that the calling party is on-hook and has abandoned the call. When the on-hook condition is detected, the program breaks down the call connection and restores the activity word for frame 2 and slot 2 within the SAM memory to idle. At the same time the program writes a 0 (indicating idle) into the port 8 portion of the PAM memory 513. This disassociates port 8 from idle 2. The system also writes a 0 into the PIP memory 601 for all ports currently associated with the currently described call. This includes calling port 8, as well as the port A for register A. This removes the slot 2 indication from these portions of PIP memory and disassociates these ports from time slot 2. The system also marks the port 8 portion of the BIM memory 510 as being idle at this time. This is done with an I2 signal applied to the top and with the port address of 8 applied to the left side of the memory.

Let it next be assumed that the called line is idle. This is determined by transferring the called port number from the TAM memory 626 to the port address buffer 606 and by interrogating the state of the called port with the hook selector 610. After the program determines that the called port is idle, it writes the ring status word into the SAM memory 507. Let it be assumed that the called station is connected to port 5. In this case, the program writes a 2 into the TALK SLOT field for the port 5 word of the PAM memory 513. The program also writes a 1 into the M field portion of the port 5 word within the PAM memory. The 1 in the M field indicates that port 5 is the called port; the 2 in the TALK SLOT field of the port 5 word indicates that port 5 is currently assigned to slot 2. These operations are performed while the program is in the dialing status and prior to the time that the ring status word is actually written into the SAM. The system also marks port 5 busy in the BIM memory 510. This is done so that port 5 cannot initiate a call and appear idle to the system during an idle frame prior to the time ringing current is applied to line 5.

After the ring status word is written into the slot 2 portion of the of the SAM memory, this word is read out and applied to bus 508 during each subsequent occurrence of slot 2. The reception of this word by the tone generator 618 causes it to generate a ringing tone and apply it to the time division bus during each slot 2 time. The ringing tone applied is returned to the calling party as an indication that the system is actively serving the call.

Four milliseconds later, upon the next occurrence of frame 2, the system is still in the ring status and the ring status program subroutine is in charge of the call. The 2 in the frame counter is transferred to the frame address buffer 515 and, from there, is applied over the bus 517 to the top input of the TALK SLOT field of memory 513. This signal, together with an I8 signal from the I/O decoder 406, causes this portion of the memory to perform a content addressable search to identify all ports currently associated with slot 2. The program also applies a signal to the E input of the M field. This signal on the E input, together with the signal on bus 517, causes both fields together to perform a content addressable search to identify the called port associated with slot 2, namely, the port that has a 1 in its M field and a 2 in its TALK SLOT field. For the currently described call this is port 5 and, therefore, the PAM memory now applies the binary bits representing port 5 to its output conductor 518. This information is transmitted through gates 519 and 605 and entered into the port address buffer 606. From the port address buffer, the port 5 address information is applied to the left side of the ring circuit 628 which, together with an I10 signal from the I/O decoder 406, causes ringing potential to be applied over output conductor 629-5 to line circuit 5. This causes the called subscriber's phone to ring.

Later on during the same occurrence of frame 2, the port address of 5 is supplied to the hook selector 610 which returns a signal through gate 613 and via buses 614 and 512 to the processor 304 indicating the hook status of the called line. Let it be assumed that the call is not immediately answered and that one or more successive frames of ringing are required. At the beginning of each occurrence of frame 2 in which ringing current is applied to the called line, the program store 404 applies an I10 signal to the ring circuit 628 and applies the port address of 5 from the PAM memory to the port address buffer 606 and, in turn, to the ring circuit 628. These signals together cause ringing current to be once again applied to line switch 612-5. On each such frame 2 occurrence, the program also checks the hook status of port 5 to determine whether the call has yet been answered. The program further causes the PAM memory 513 to do a content addressable search to identify the calling port. This is done by applying a 0 to the top input of the M field and a 2 to bus 517 from the frame address buffer 515. Since the calling port is port 8, the PAM memory applies an indication of port 8 through gate 519, over path 603, and through gate 605 to the port address buffer 606. The port 8 address is then applied by buffer 606 to the hook selector 610 which returns a signal indicating the current hook status of the calling party. If the calling party has not abandoned the call and is still off-hook, the system continues to serve the call. If the calling party is on-hook and remains on-hook for a predetermined number of successive frames, the system releases the call and initializes all portions of memory associated with the call in the same manner as already described.

Let it be assumed that on the next occurrence of frame 2 that the called party answers. This off-hook condition is returned by the hook selector to the program to advise it that the call has been answered.

During the same frame in which the off-hook condition is detected, the port address of 5 is applied to the left input of the PIP memory 601. A WRITE signal is applied to its upper input from the PIP logic circuit 617 under control of the I8 signal; and a 2 is applied to the lower input of the PIP memory 601 from the slot counter 502 via the multiplexer 620. These three signals together cause a 2 to be written into the port 5 portion of the PIP memory. From then on, each time that the slot counter advances to its position 2, the reception of a 2 at the lower input of the PIP memory causes it to perform a content addressable search to identify and activate all ports associated with slot 2. This connects these ports to the time division bus for the duration of each slot 2 occurrence. For the present call, during each subsequent occurrence of slot 2, the line switches for both port 8 and port 5 are closed since a 2 is stored in the portions of the PIP memory associated with each of these ports.

The program updates the status of slot 2 in the SAM memory from ring to talk when the call is answered. On each successive frame 2 occurrence, the program effects the content addressable searches of the PAM memory 513 to read out the identity of ports 5 and 8 in sequence. This information is read out sequentially and applied to the hook selector 610 which returns information to the program regarding the supervisory status of each party. As long as both parties remain off-hook, the call continues and no further system action is required. When one party goes on-hook and it is determined that the on-hook condition is a call abandonment and not a hit or a switchhook flash, the call is released and the memories associated with the call are initialized.

DESCRIPTION OF MULTIPLE REGISTER OPERATION

In a system equipped with a plurality of originating registers 622—, the port address of the register used on a call is written into the PAM memory 513 in the same manner as that described for the writing of the port number of the calling or called line into the memory. On each successive appearance of the frame serving the call, a content addressable search is made of the PAM memory to derive successively the port address of the register as well as that of the calling party. The port number that is read out on each search is controlled by the frame number on path 517 as well as by the binary bit received by the M field from conductor E from the COMPARE field of the program store 404. A 0 on conductor E causes the memory to read out the port number of the calling party; a 1 on conductor E causes the memory to read out the port number of the originating register when the call is in the dialing status. When the call is in the ringing and talk status, a 1 on the E conductor causes the port number of the called party to be read out.

DETAILED DESCRIPTION OF THE PIP MEMORY 601

The operation of this memory is described with reference to the writing and subsequent erasure of a frame number in the port word of an originating register 622. Register 622-A has a port address of A; it is connected to line switch 612-A and it is associated with port A of the time division bus. Let it be assumed that the call is being processed by frame 2 and that the call is in the stage of completion where the port address of A is in the port address buffer 606 and is being applied via bus 609 to the left input of the PIP memory 601. The multiplexor 620 operates in such a manner that unless an I8 signal is received, the 2 applied to the S input of the multiplexor from the output of the slot counter 502 goes through the multiplexor to the bottom input of the PIP memory. This causes the memory to perform a content addressable search for all ports containing a 2.

Figure 14:
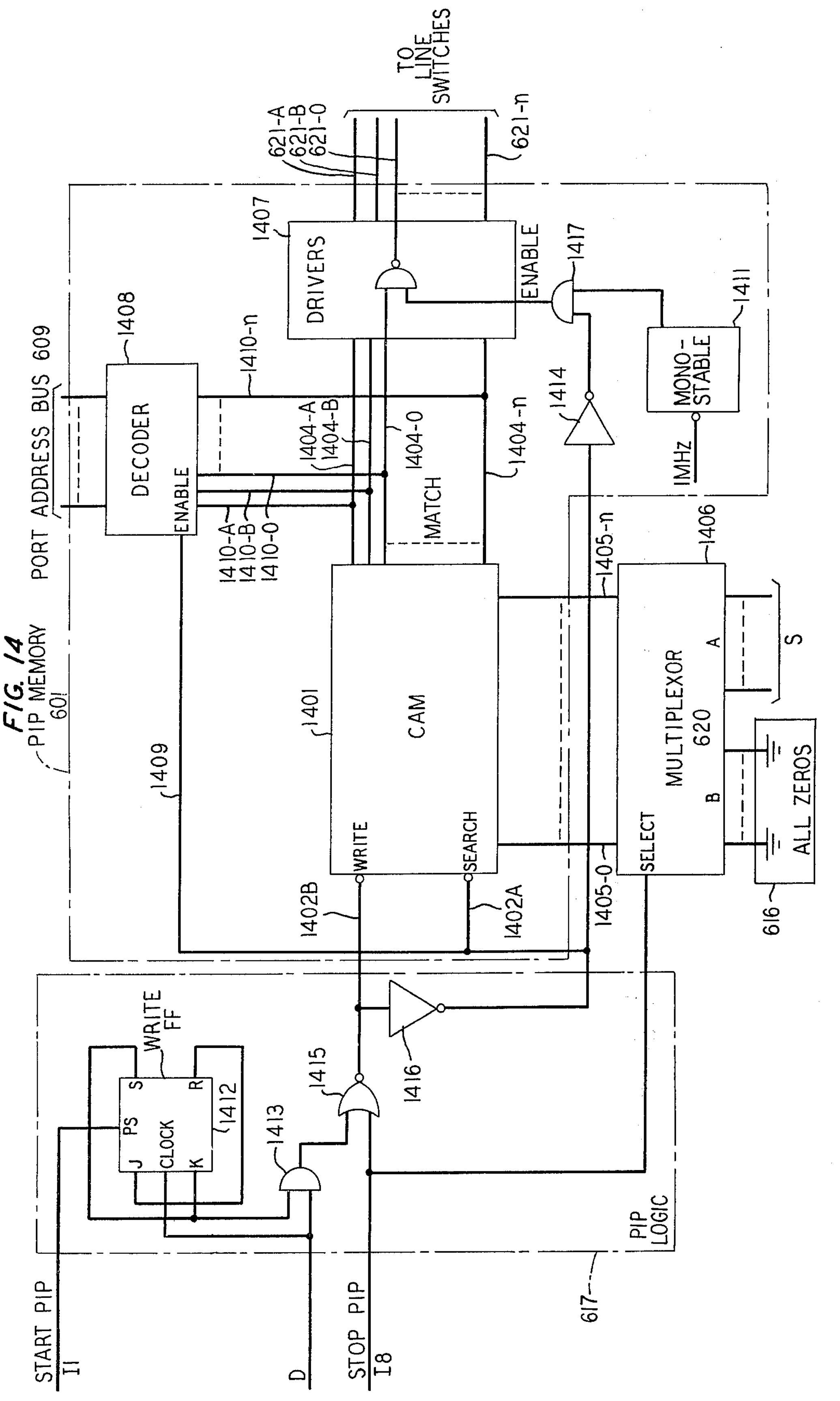
FIG. 14 illustrates the details of the PIP memory 601.

As shown in FIG. 14 in order to write a 2 into port A for register 622-A, the program store 404 applies an I1 signal to the PIP logic circuit 617. This sets a flip-flop 1412 as will be further discussed. Subsequently, during the last microsecond of frame 2 when the 2 in the slot counter matches the 2 in the frame counter, a comparison is detected by comparison circuit 503 which applies a pulse to the D input of the PIP logic circuit 619. This D signal, together with the I1 signal which was priorly received, applies a WRITE signal to the upper input portion of the PIP memory 601. This signal together with the port address of A from the port address buffer 606, together with the 2 on the bottom input of the PIP memory, causes a 2 to be written into the portion of this memory associated with port A.

On the subsequent appearance of slot 2, the 2 applied to the S input of the multiplexor is received by the PIP memory, and causes it to perform a content addressable search for all of its words currently having a 2. This activates each of its output conductors associated with each word determined to have a 2. The output signal applied to each such conductor during the slot 2 time closes its line switch and connects it to the time division bus for the duration of time slot 2. For the call currently described, the portions of the PIP memory representing ports A and 8 currently are storing a 2 and, accordingly, they activate their output conductors 621-A and 621-8 to close line switches 612-A and 612-8 during the slot 2 time. This causes originating register 622-A to be interconnected with the calling party during time slot 2.

The system and the PIP memory remain in this condition as long as the calling party continues to dial and until an end of dialing signal is detected. After dialing is completed, the calling party must be disconnected from the originating register and connected to the called party. In order to disconnect the register from the time division bus, an I8 signal from I10 decoder 406 is applied to the right side of the multiplexor 620 at the time when an A for the port address of the register is stored in the port address buffer 606. The I8 signal constitutes a write command and erases the 2 that is currently in the port A word and in its place causes a 0 to be written. This 0 is received from All ZEROS circuit 616 and it effectively disconnects the register from the calling party since the line switch 612A of the register is no longer activated during the time slot 2.

There are two ways by means of which the PIP logic circuit 617 receives a WRITE pulse. One is by the sequential application of an I1 signal (which sets a flip-flop) followed by the receipt of a D signal in response to a match signal from compare circuit 503. The other way is by the receipt of an I8 signal. That, in itself, causes the PIP logic circuit to generate a WRITE pulse. With respect to the multiplexor, the I8 signal inhibits the S signal which is the current slot number and steers a 0 from circuit 616 to the lower input of the PIP memory.

The receipt of information such as a 2 on the lower input of the PIP memory 601 without a write pulse on the upper input causes the PIP memory to perform a content addressable search. On the other hand, the receipt of a 2 on the lower input of the PIP memory with a WRITE signal on the upper input and a port address on the left-hand input, causes the digit on the lower input to be written into the causes the digit on the lower input to be written into the indicated port address word.

DESCRIPTION OF SOM MEMORY 531

The purpose of the SOM 531 (Service Option Memory) memory is to define the class of service to which each port is entitled. For example, if a calling party dialed a 9 for a central office call, his port address would be applied to the left side of the SOM memory which would gate onto the compare bus 512 information indicating the class of service to which the calling port is entitled. If the party is entitled to unrestricted service, the SOM might apply the digits 1000 over the compare bus to the lower input of the comparator 409. At the same time, the compare field of the program store 404 would apply the same digits to the upper input of the comparator. If a comparison is detected, a match signal is generated and applied via gate 411 to the OP DECODER 407. This match indicates that the calling party is entitled to the type of service he is currently requesting.

The service option memory (SOM) typically might contain a 24 binary bit word for each port address. This 24-bit word would be subdividable into a plurality of fields and only one field at a time would normally be required to serve a certain stage of a call. In order to gate out only the digits of the required field onto the compare bus, the SOM has a plurality of strobe inputs, in this case four, which are designated C9 through C12 with each strobe input being associated with a different field. The reception of a particular strobe pulse gates out the binary bits for its associated field onto the compare bus 512. Thus, if port 8 dialed a 9 to initiate a call, one particular field of the SOM might be gated out to indicate the class of service to which port 8 is entitled. On the other hand, if port 8 were called and found to be busy, another field of the port 8 word would be applied to the compare bus to indicate whether hunting is permitted on calls directed to port 8.

DESCRIPTION OF THE HAM MEMORY 607

The HAM (hunting address memory) 607 is used for hunting purposes when the first port the system attempts to use on a call is found to be busy. For example, let it be assumed that port 8 is called and is determined to be busy. In this case, the port 8 service option information is read out of the SOM memory to determine whether hunting is permitted for calls directed to the port. Let it be assumed that hunting is permitted. In this case, the port address of 8 is applied to the HAM memory 607 which applies, via gates 608 and 605, to the port address buffer the port address of the next line to be hunted such as, for example, port 10. With a port address of 10 in the port address buffer, the status of port 10 is determined by the hook selector and if the port is idle, the call is completed to it. If the port is busy, the port address of 10 is then applied to the HAM memory which generates and applies to its output conductors the address of the next port to be hunted. This operation continues until an idle port is found, until all ports of the hunting group have been hunted, or until the call is abandoned, all depending upon the program.

DETAILED DESCRIPTION OF ATTENDANT-CO TRUNK-REGISTER MEMORY 624

This memory contains the port addresses of the attendants, the CO trunks, and the originating registers.

In order to describe this circuit further, let it be assumed that a party dials a 9. Upon the detection of the 9, the program causes this circuit to gate out the port address of the first CO trunk that should be tested for an idle condition to serve the call. This gating function is performed by applying a G5 gating signal to the memory 624. The reception of this signal causes the memory to generate the required address and apply it out over its output conductor 624A to the input of gate AND 623. The G5 gate signal also is extended to OR gate 631 whose output then acts as a strobe or further gate input to AND gate 623 so that the required address is applied via bus 603 and gate 605 to the port address buffer 606. The memory functions in the same manner for calls requiring an attendant; it functions in the same way when the system is hunting for an idle originating register. In the event that the port is busy that represents the first attendant, the first trunk, or the first register to be hunted, depending upon the type and stage of the call, the HAM memory is used in the manner already described to generate and enter into the port address buffer 606 the port address of the next circuit or port to be hunted.

DETAILED DESCRIPTION OF THE SLOT LOGIC CIRCUIT FIGS. 8 AND 9

The following describes the slot logic circuit 505. This circuit has two inputs designated H and A on FIG. 5. The H input receives the output of the compare circuit 503. The A input receives the output of the one megahertz oscillator 501. The outputs of the slot logic circuit are designated B and D. The B output extends to gates 401 and 509 which provide a strobe or gating signal to enter program address information from bus 508 via gate 402 into the P counter 403. The D output of the slot logic circuit increments the frame counter 504. The D output is also applied as a control signal to the right side of the PIP logic circuit 617.

Figure 8:
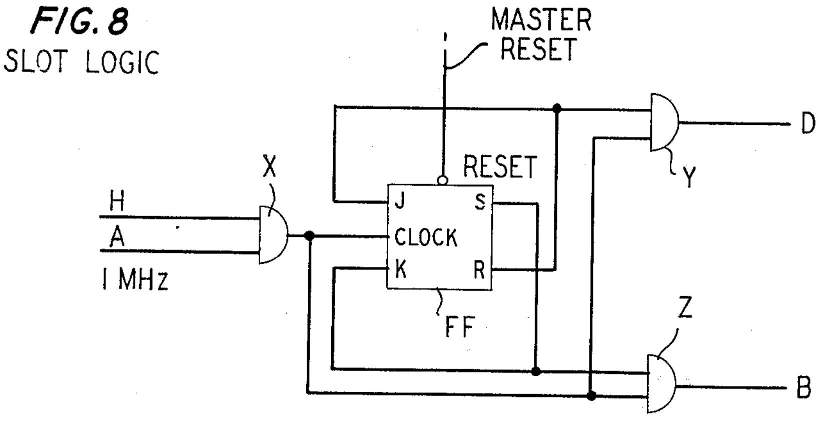
FIG. 8 illustrates the circuit details of the slot logic circuit of FIG. 5.

FIG. 8 shows the details of the slot logic circuit 505. The A input from the one megahertz oscillator 501 and the H input from the compare circuit 503 both go to the input of AND gate X. The circuit also has a Master Reset input which is used upon the initialization of the system. This input resets the flip-flop FF. Both the slot counter 502 and the frame counter 504 of FIG. 5 advance in response to negative-going signals. The slot counter 502 advances upon the receipt of a negative-going signal from the oscillator 501; the frame counter advances in response to a negative-going D signal from the slot logic circuit.

Figure 9:
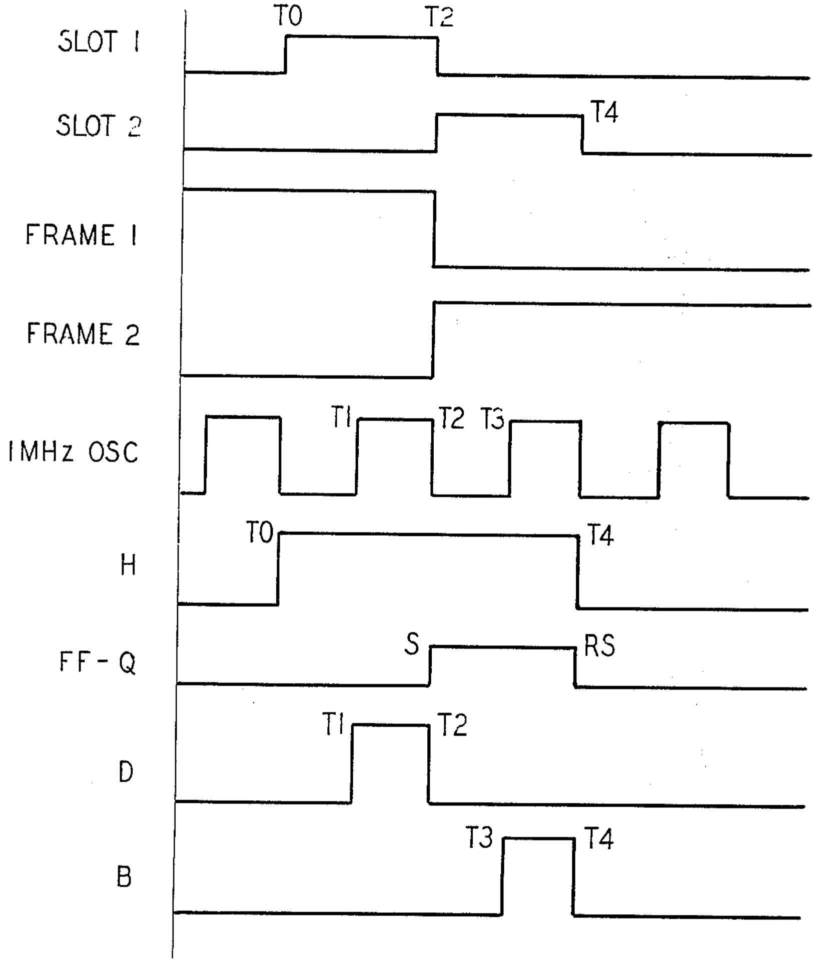
FIG. 9 is a timing diagram which illustrates the relationship between slots and frames as well as the input and output signals of the circuit of FIG. 8.

The flip-flop FF on FIG. 8 is basically a conventional JK flip-flop and is; initially assumed to be in a reset state in which its S output is low and the R output is high. Let it be assumed that the frame counter is in a count of 1 and that at time T0 on FIG. 9 the slot counter 502 assumes a count of 1. The output of the compare circuit 503 goes high at time T0 when it detects the 1 in both counters. This high is ANDed by gate X at time T1 with a positive-going signal from the one megahertz oscillator and the output of the gate X applies a "clock" input signal to the flip-flop FF. The flip-flop FF sets at time T2 which is the beginning of the negative-going transition of the clock signal. The flip-flop FF is wired in the toggle mode so that each time it receives a negative-going clock pulse it switches state. Thus, the receipt of a negative-going pulse from the AND gate X at time T2 switches the flip-flop from a reset to a set state.

It has been stated that there is a 1 microsecond delay from the time the compare circuit 503 detects a comparison of the slot and the frame counters and the time the frame counter is incremented. This is illustrated on FIGS. 8 and 9. The H signal goes positive when the comparison is first detected which is time T0. With reference to the one megahertz signal, it is one cycle later of this signal at time T2, that the negative-going transition of the D signal occurs and is applied to the frame counter 504 to increment it. The D signal is first generated at time T1 with a positive-going transition of the oscillator and the A signal when the R output of the flip-flop FF is high.

Both the frame and the slot counters advance to their next position at time T2. The slot counter 502 advances directly in response to the negative transition of the clock output. The frame counter 504 advances from the negative-going transition of the D signal.

Output signal B is produced at time T3 by the ANDing of the clock signal with the S output of the flip-flop. Both of these outputs are high at time T3 and for one-half microsecond thereafter until the clock output goes negative at time T4. The B output provides a gate signal which permits the contents of bus 508 to be entered into the P counter 403.

The flip-flop FF switches state and resets at time T4 on the next negative transition of the clock signal. At time T4 both the clock output and the H output from the compare circuit begin a negative transition.

With respect to the presently described call, the description began with both counters in a count of 1; the compare circuit 503 detected the 1 in both counters and advanced the frame counter to 2; the slot counter advanced to 2 under control of the clock 501. Although at this time both counters are in a count of 2, the compare circuit does not detect this match because of the circuitry of FIG. 8. It is the D output signal that advances the frame counter. This signal can be generated only when the flip-flop FF is in a reset state. With respect to FIG. 8 and 9, the flip-flop FF is in a reset state when the counters are both initially in a count of 1;the positive transition of the D output signal is generated at time T1; the flip-flop is set for a one microsecond interval at time T2 which is the negative transition of the D output. Since the flip-flop remains in a set state for 1 microsecond (the entire duration of slot 2), this prevents the comparison circuit from incrementing the frame counter at time T4 even though both counters are in a count of 2.

DESCRIPTION OF PROGRAM OF FIG. 10

FIG. 10 illustrates a typical program that may be used in the system of the present invention. Specifically, FIG. 10 illustrates the idle status program. This program or subroutine controls the system during the occurrence of each time frame associated with a slot that is not serving a call. The function of the system during each occurrence of a frame in an idle status is to scan line circuit ports to detect new service requests.

Each slot that is not serving a call has the call status word of idle written in its associated word of memory in the SAM memory 507. Upon the initiation of the frame associated with an idle time slot, the idle status word is transmitted from the SAM memory by bus 508 and entered in the P counter 403 as the first word of the idle subroutine in the program store 404. On FIG. 10, the various columns of the chart, with the exception of the left-most column designated "status", correspond to the various fields of the program store memory 404. Although the fields correspond on a one-to-one basis, they do not appear in the same order proceeding from left to right since on FIG. 4 the memory is shown in essentially hardware form while on FIG. 10 the program is shown in the manner in which it is written by the programmer prior to being assembled into binary bits and entered into the memory 404.

The "status" column on FIG. 10 is primarily a "comments" type column and does not correspond to a field of memory. The various rows on FIG. 10 represent memory words of the idle subroutine. These rows are designated 1 through 15 for each of understanding rather than by the actual binary addresses they might have after the program is assembled and entered in binary form into the program store.

Word 1 of the subroutine of FIG. 10 is designated idle in the status field and the address of this word is received in binary form from the SAM memory and entered into the P counter 403. The command in the OP field of this word is designated DTA and, as shown on FIG. 4, the binary digits representing this command control the OP decoder 407 so that it applies the signals to its conductors Z1 through Z8 to perform the information gating functions required of the system at this time. Among the functions performed by the OP decoder 407 is to enter the address of the next instruction into the P counter 403. The "next address field", NEXT ADD, of word 1 contains a 2. On FIG. 4 it can be seen that this 2 is gated under control of a Z2 signal via gates 416 and 402 to the P counter 403.

The PAC Command in the "port address bus" field is applied to the control gates 405 to generate the signals required on conductors G1 through G11 to perform information gating functions. For example, it has been explained how the contents of the port address counter 602 are entered into the port address buffer 606 to initiate a port scanning operation. On FIG. 6, it can be seen that the gating of the information from the port address counter 602 to the port address buffer 606 requires a G3 signal to gate 630 and a Z7 signal to AND gate 605. The G3 signal is generated under control of the PAC in the "port address bus" field; the Z7 signal is generated under control of the DTA instruction in the "OP" field.

For the program now being described, the contents of the PAC 602 represent the port address of the next port that's to be scanned to detect a possible service request. At the end of the word 1 time and under control of the P counter, the program advances to the next address which is shown as 2 on FIG. 10. This address contains another DTA instruction and it causes a 3 to be entered into the P counter 403 as the next address. The ADV PAC in the I/O control field advances the PAC 602 one step by causing the I/O decoder 406 to generate an I4 signal.

The program next advances to address 3 which contains a DEC type instruction. The purpose of this instruction is to make a binary decision with the assistance of the comparator 409. The purpose of this decision is to determine whether a certain system condition does or does not exist. The instruction HOOK in the CC field generates the signals on conductors C1 through C12 to perform the gating functions required at this time. The instruction ON in the W field applies a signal to the upper input of EXCLUSIVE-OR gate 411. This signal is of the type required to generate a true or an exclusive OR condition at this time with respect to the output of the comparator 409 which is applied to the lower input 409A of gate 411. The ON in the M and P columns in the COMPARE field supplies information to the comparator 409 so that the comparator will generate a signal representing a comparison condition in the event that the scanned port is on-hook. If the scanned port is on-hook, a comparison is detected and a comparison signal is supplied to the lower input 409A of gate 411. This signal and the on-hook signal applied to the upper input of the gate 411 from the W field cause gate 411 to apply a signal to the OP decoder 407 on path 411A to cause it to generate a Z2 signal. The Z2 signal gates the address of 7 in the NEXT ADDRESS column via gate 416 to the P counter 403. Address 7 is a WAIT instruction in which the program does nothing for the duration of the frame.

The previous paragraph described how the program advanced from word 3 to word 7 if the scanned port was determined to be on-hook. Alternatively, let it now be assumed that while the system is in word 3 that the scanned port is found to be off-hook. In this case, the EXCLUSIVE OR gate 411 does not detect a true condition and, instead, the OP decoder 407 generates a Z4 signal which increments the P counter by 1 and advances the program to word 4.

Instruction 4 causes the system to search the busy-idle memory 510 to determine whether the currently scanned port was busy or idle the last time it was scanned. The BIM instruction in the CC field causes the COMPARE FIELD CONTROL circuit 408 to apply potentials to the C-conductors to perform the gating functions required at this time. Included among these functions are the generation of a Cl potential which is applied to gate 511 to gate the contents of the word of the BIM memory 510 that is associated with the scanned port to the lower input of the comparator 409. The information indicates the busy-idle status of the currently scanned port during the last time it was scanned. The BUSY instruction in the W field applies the required signal to the upper input of the exclusive OR gate 411 so that the gate will generate a true output signal in the event that this port was busy the last time it was scanned. The BUSY instruction in the M and P columns of the compare field apply a signal representing a busy condition to the upper input of the comparator 409 so that a match from this circuit will be obtained in the event that the port was busy last time it was scanned.

If the port was busy on its last scan, gate 411 receives a true condition on both of its inputs and transmits a signal to this effect to the OP decoder 407. This causes the decoder to generate signals on various ones of its conductors Z1 through Z8 to perform required information gating functions. Included among the functions performed at this time are the gating of a 7 from the NEXT ADDRESS field of the program store via gate 416 under control of a Z2 signal and via gate 402 to the P counter to advance the program to instruction 7. Instruction 7 is of the WAIT type in which the program performs no useful function for the duration of the frame.

The significance of the transfer from instruction 4 to instruction 7 is that on instruction 4 the port that has been found busy on the current scan was also determined to have been busy on the last scan. Therefore, the current busy state of this port is construed not to be a new service request. Instead, it may be a line or a port in a talking condition in another slot. Such a line or such a port requires no service by this subroutine. Therefore, it advances to instruction 7 and the system waits for the initiation of the next frame to serve another call.

Alternatively, let it be assumed that the currently scanned busy port was reported by the BIM memory to be idle on the last scan. In this case, a true condition is not received by the gate 411 and its output controls the OP decoder 407 so that the OP decoder generates a Z4 signal to increment the P counter 403 one position to instruction 5.

A DTA instruction, such as in address 1 or 2, performs the indicated operations in the control fields and it also advances the program to the address indicated in the NEXT ADDRESS field. This next address for a DTA instruction may be the next word of the subroutine; alternatively, it may be any other word of the subroutine. The DTAR instruction, such as in address 5, performs the same function as the DTA instruction except that it also transfers the contents of the P counter 403 to the RS counter 410 where the address information is stored for subsequent use. The RS counter 410 may comprise any conventional storage register or counter. In conventional programmer terminology, the DTAR may be termed a subroutine call.

With respect to the DTAR instruction of word 5 and the functions performed by it, the FC in the right-hand column of the SLOT STATUS field causes the contents of the frame counter 504 to be transferred via gate 514 to the frame address buffer 515. Word 5 also writes a 2 for the frame number into the port address word 8 in the port address memory (PAM) 513. This is jointly accomplished by a WRITE PAM in the I/O control field, by WRITE ZERO in each of the M and P fields of the COMPARE field, and by a WRITE TALK SLOT instruction in the CAM field. The writing of a zero in the P and M portions of the PAM memory indicate that port 8 is the calling port. The WRITE TALK SLOT instruction causes the 2 in the frame address buffer to be transferred via gate 516 and bus 517 and written into the talk slot portion of the PAM memory. The appropriate signals are applied to the control conductors of the PAM memory at this time to effect a write operation. These include an I7 signal from the I/0 decoder 406. At this time the port address buffer 606 is supplying the address of port 8 to the left input of the PAM memory 513 so that the 2 is written in the port 8 portion of the PAM memory word.

In summary, the function performed by program instruction 5 is to write the appropriate information in the port 8 word portion of the PAM memory to indicate that port 8 is, for the time being, associated with frame 2 and slot 2.

Word 8 of the program in FIG. 10 is the next address and is a DTR type instruction. What this instruction does is to perform the work indicated in the I/O CONTROL field and then transfer the contents of the RS register 410 to the P register and increment the P counter by one. In the current case, the RS register has a 5 in it since the program jumped from the DTAR instruction of word 5 to the DTR instruction of word 8. Thus, after the I/O CONTROL field function is performed for word 8, the 5 in the RS register 410 is transferred back to the P counter 403 and the P counter 403 is incremented by one by Z4 so that the subroutine will advance to word 6.

With respect to the DTR instruction of word 8, the SET BIM command marks port 8 busy in the BIM memory 510. The information identifying port 8 is received at this time from the port address buffer 606 via bus 609 and is applied to the left input of the BIM memory. The signal required to mark this port busy are received from the I/O decoder 406 and, as shown on the drawing, constitutes an I3 signal. This I3 signal is generated by the SET BIM instruction and the I/O decoder 406. The DTR instruction in the OP field causes the OP DECODER 407 to apply signals to the required combination of its output conductors Z1 through Z8. The marking of port 8 busy in the BIM memory prevents this port from being seized during another time slot of the system.

After the work function for the DTR instruction of word 8 is performed, the program goes to instruction 6 as already mentioned. This instruction is of the DTA type; it writes the new status of the call into slot 2 of the SAM memory 507. The DTA instruction in the OP field causes the required combination of signals to be applied to conductors Z1 through Z8. The write SAM instruction in the I/O CONTROL field causes signals to be applied to the various ones of the I0 through I16 conductors to perform the work functions required at this time. The REG REQUEST in the SLOT STATUS field represents the new call status word for frame 2 and port 2. This status word is applied from this field and over path 412 to the upper input of the SAM memory 507. Then, under control of the I15 signal and under control of the 2 applied to the right side of the memory by the frame counter 504, the new status word of REG REQUEST is written into the slot 2 portion of the SAM memory. This new status word is written into the slot 2 portion of the memory under control of the 2 from the frame counter 504 irrespective of the setting of the slot counter 502 at the time this is writing operation occurs. In other words, even though the slot counter may be in a position 45, and applying a 45 to the left-hand input of the SAM memory, the 2 applied to the right input from the frame counter is the controlling signal at this time and causes the register request status word to be written into slot 2.

The program next goes to word 9 under control of the 9 in the NEXT ADD column of word instruction 6. Even though slot 2 of the SAM memory has a REG REQUEST status word in it at this time, the processor performs work during the remainder of this frame occurrence in accordance with the IDLE status word that was priorly in slot 2. Another item of work to be performed in this occurrence of frame 2 is to go to word 9 which is a DTA type instruction and which, by means of the START PIP command in the I/O CONTROL field causes a 2 representing slot 2 to be written into the port address portion of the PIP memory 601. More specifically, the START PIP instruction causes the I/O decoder 406 to apply signals to various ones of conductors I0 through I16 to write the required information into the PIP memory at this time. From FIG. 6 it may be seen that this includes the generation of an I1 signal which, as already mentioned, sets a flip-flop in the PIP logic circuit 617. After this flip-flop is set the comparison that is detected during the last microsecond of frame 2 applies a signal to the D input of the PIP logic circuit which then under control of the 2 applied to the S input of the multiplexor 620 writes a 2 into the PIP memory 601. In our example the port address of 8 applied to the left input of this memory on bus 609 causes the 2 from slot counter 502 to be written into the word 8 portion of the memory. This has already been described in detail in the hardware portion of this description.

The program next goes back to word 7 which is a wait instruction and which causes the processor to perform no further work for the remainder of this occurrence of frame 2.

On the next occurrence of frame 2, the REG REQUEST call status word is read out of the SAM memory 507, entered into the P counter 403, and directs the program store to the first address of the register request subroutine which is shown as word 11 on FIG. 10. This is a DTA type instruction and it controls the OP DECODER 407 to generate the Z1 through Z8 signals required at this time. The SEARCH PAM instruction in the I/O CONTROL field causes the I/O DECODER 406 to generate the required signals on conductors I0 through I16. The FC signal in the FRAME ADD BUS column causes the frame address of 2 to be applied to the upper input of the TALK SLOT field of the PAM memory 513. The SEARCH FOR ZERO in the M and P fields together with the SEARCH TALK SLOT in the CAM field generates the required control signals so that the PAM memory performs a content addressable search to identify the calling port associated with frame 2. This is assumed to be port 8 for the currently described call and, therefore, a port 8 indication is applied from the ouput of the memory and transferred to the port address buffer 606 in the manner already described. The SEARCH FOR ZERO in the M and P fields indicates that port 8 is the calling port since a 0 was written in the port 8 portion of the PAM memory in instruction 5.

After the PAM memory 513 performs this function, the program advances to instruction 12 which is of the DEC type. This instruction uses the match output of the PAM memory to determine whether or not a successful content addressable search was performed during instruction 11. For the presently described call, the match indication is applied to the lower input of gate 526 and from there via the compare bus 512 to the lower input of the comparator 409 to advise it in the program that a match was found. If no match is found, this represents a trouble condition and the program advances to word 14 which represents an alarm condition of the system. The remainder of the alarm function is not illustrated on this program since an understanding of its details is not necessary for an understanding of the claimed invention.

Let it be assumed that a match condition is obtained and in this case the program is advanced to word 13 by incrementing the P counter one step under control of a Z4 signal. Instruction 13, which is of the DTA type, applies the output of the PAM memory 513 to the port address buffer 606. At this time, the port address buffer receives an 8 indicating that port 8 is associated with frame 2. The program next goes to instruction 15 which determines the state of port 8 by means of the hook selector 610. If the port is determined to be on-hook, this represents a disconnect condition and the system then writes a DISCONNECT call status word in the SAM memory and the portions of the memories associated with port 8 are initialized on the next occurrence of frame 2. The on-hook state of port 8 at this time indicates that the priorly detected off-hook state was either a momentary switchhook flash, a hit, or some sort of noise signal other than a valid service request.

Alternatively, if port 8 is determined to be off-hook at this time, this condition is construed to represent a valid service request and the system is then placed under control of a subroutine which causes it to search for an idle originating register.

The program store advances from instruction to instruction under control of the P counter 403 and the system clock 415. The P counter determines the next address or instruction to which the program store will advance; the rate at which the program proceeds from instruction to instruction is determined by the system clock. The system clock is sufficiently slow so that it allows enough time for the work associated with each instruction to take place.

Figure 11:
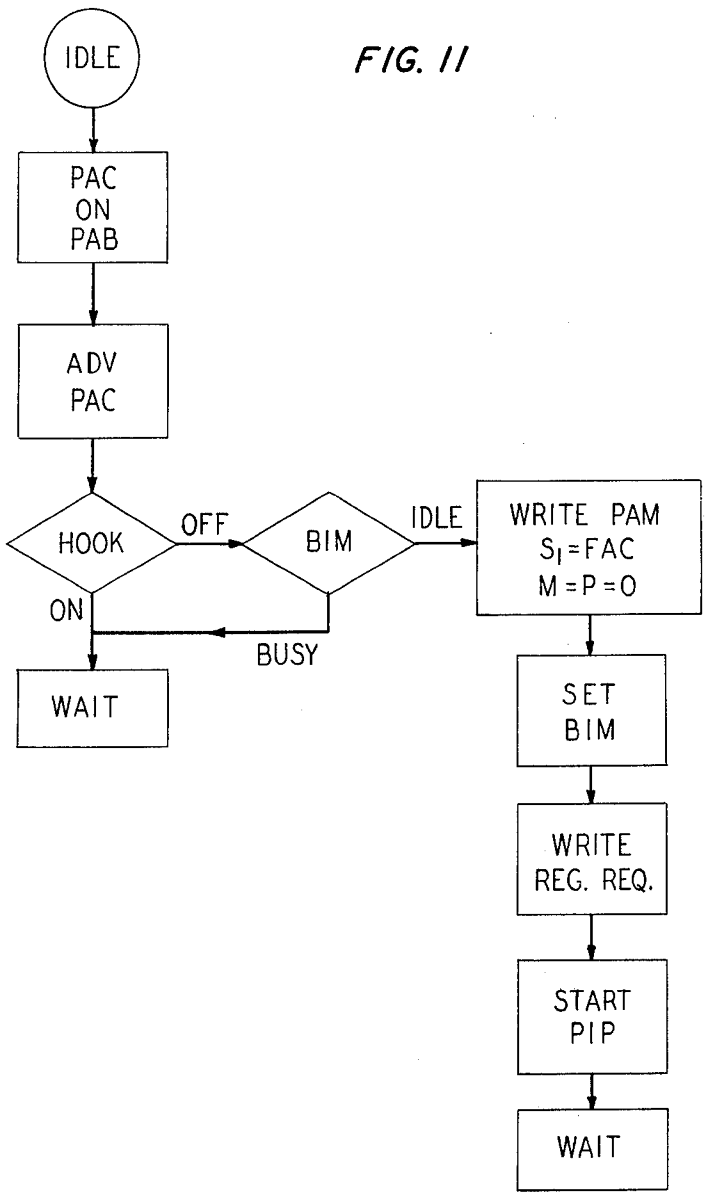
FIG. 11 and 12 illustrate the program of FIG. 10 in flowchart form.
Figure 12:
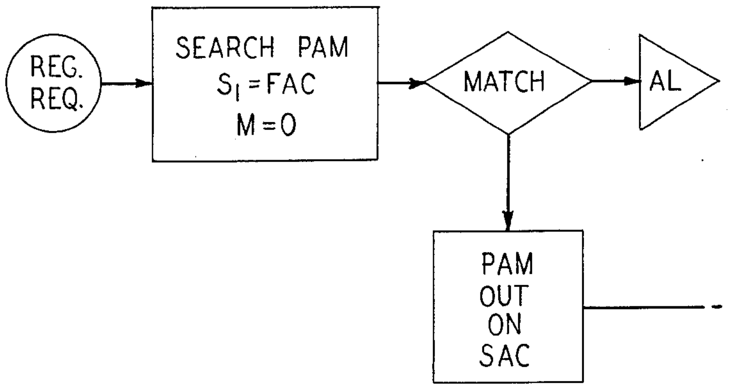

FIG. 11 illustrates in flowchart form the IDLE program subroutine set forth in lines 1 through 9 of FIG. 10. FIG. 12 illustrates a partial flowchart of the REGISTER REQUEST subroutine set forth in lines 11 through 15 of FIG. 10. No detailed comments regarding FIG. 11 and 12 are believed necessary since the same system operations have already been described in connection with FIG. 10.

Detailed Description of the PAM Memory 513

Figure 13:
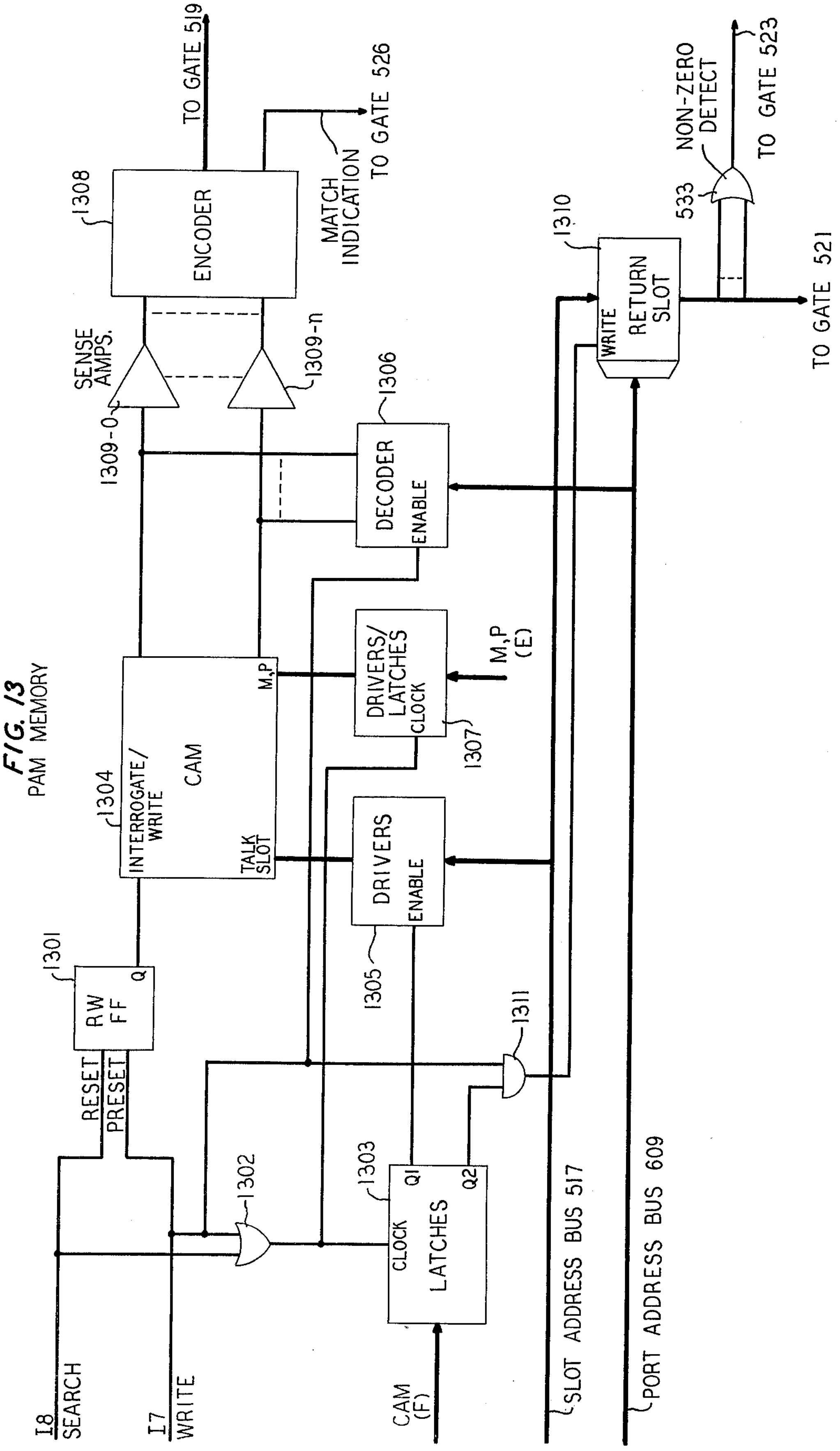
FIG. 13 illustrates the details of the PAM memory 513.

FIG. 13 discloses the details of the circuit elements that comprise the PAM memory 513. The system functions of this memory have already been described. This portion of the specification is limited to a description of the various elements that comprise the PAM memory. Unless otherwise noted, all references to the Texas Instrument components may be found in "The Integrated Circuits Catalog for Design Engineers" (First Edition 1971) published by Texas Instruments, Inc. Page number references are indicated after the first appearance of each part number.

Flip-flop 1301 as well as LATCHES 1303 may be composed of Texas Instrument type SN7476JK flip-flops (page 6–58 ). The CAM memory element 1304 is a Texas Instrument TMS 4000 content addressable memory integrated circuit (page 14–232). DRIVERS 1,305 are Texas Instrument SN7401 integrated circuits (pages 6–6) which are open collector, two input NAND gates. DECODER 1306 may comprise Texas Instrument SN7442 integrated circuitry (9–148). The latch portion of the DRIVER LATCHES 1307 are Texas Instrument SN7475 integrated circuits (9–213). The driver portion of element 1307 comprises Texas Instrument SN7401 integrated circuits. Encoder 1308 comprises Texas Instrument SN74148 integrated circuits and is of the priority encoder type. The sense amplifiers 1309 are RCA CD4009E integrated circuits which are complementary MOS inverters. Reference to the RCA CD4009E is found at File 445 (printed 8/70) in the "RCA Semiconductor Products Databook," a catalog published by the Radio Corp. of Amercia. The return slot memory 1310 is a Texas Instrument type SN7489 integrated circuit (page 9–236).

The operation of the PAM memory is first described in connection with a content addressable search operation. The receipt of an I8 search signal resets the RW flip-flop 1301 and causes the output of the flip-flop to go low. The information stored in the CAM field of the program store 404 is gated into LATCHES 1303 via path F under control of signal from gate 1302. The CAM element 1304 is currently receiving a low on its interrogate/write input; and this low causes this element to perform a port searching operation based on the information received from DRIVERS 1305 and DRIVERS/LATCHES 1307. The CAM element 1304 applies its output information to the SENSE AMPLIFIERS 1309- which, in turn, feed this information into ENCODER 1308.

The encoder is of the priority type. The outputs of the sense amplifiers 1309-0 through 1309-n are connected to corresponding individual inputs of the encoder. The 0 input of the encoder is considered to have the lowest priority; the *n* input is considered to have the highest priority. If the 0 is the only input that is active, the encoder will produce a 0 binary code on its output which goes to gate 519 to FIG. 5. It also produces a match indication signal which goes to gate 526. If both the 0 and the 3 inputs are active at the same time, the encoder generates a binary 3 for its output. If any encoder input is active, the match indication is always high. The return slot memory 1310 is not active during the search operation.

The CAM memory 1304 is content addressable. This memory can perform four functions and these are: search, write, mask search, and mask write. It is an important characteristic of this device that a search or write operation can be performed on only certain selected bits and the other bits do not respond to that particular action. This is called a mask search or mask write operation on the bits not affected.

There are actually two bits of information stored in the TMS 4000 integrated circuits comprising the CAM memory 1304 for every bit of information used by the system. These two bits determine whether or not the operation called for on the interrogate/write input is performed on the particular bit slice in question. For the P and M sections of the CAM memory, the P and M information from the program store directly defines these two bits of input for each bit slice of the field in question. For the TALK SLOT field, the two information bits are provided to DRIVERS 1305 from the LATCHES 1303. These are two bits of information in LATCHES 1303 since the entire talk slot is treated as one field.

A write operation of the CAM memory is next described. When the 17 signal goes high, the RW flip-flop 1301 is set and drives its output high. The CAM field of memory 404 is then grated into the LATCHES 1303 and the M and P fields are gated into the DRIVER/-LATCHES 1307. DECODER 1306 is enabled at this time and, as subsequently described, the RETURN SLOT MEMORY 1310 is written via gate 1311.

There are three considerations involved in the writing of the CAM memory 1304. The first is that the interrogate/write input must be high; the second is that the port word in the CAM memory to be written must have its match line (which connects into the sense amplifiers) held low. This is accomplished by DECODER 1306 decoding the information on the PORT ADDRESS BUS 609. Note that the 17 WRITE signal controls the enable for DECODER 1306. Third, the frame, P and M information presented to the data inputs of the CAM memory 1304 by DRIVERS 1305 and DRIVERS/LATCHES 1397 determines whether the talk slot, P and M fields, will be written or whether a mask write will be performed. The mask write is identical to the mask search while has already been described. During the write operation, the outputs of ENCODER 1308 have no meaning.

The following describes the return slot function. If, during a write operation, the most significant bit of the CAM field is a 1, a write signal is generated via gate 1311 and applied to the RETRUN SLOT MEMORY 1310. The output of gate 1311 connects to the WRITE input of all the SN7489 integrated circuits which comprise the RETURN SLOT MEMORY. This input is the write enable input and it causes whatever information is present on the data inputs to be written into the address word. The address word for the RETURN SLOT MEMORY is provided from the PORT ADDRESS BUS 609 and the data to be written comes from the slot address bus 517. If the RETURN SLOT MEMORY is not currently being written, it is constantly performing a read operation. The word to be accessed corresponds to the address information on the port address bus. The access information is always presented to the output bus and, in turn, to gate 521. Gate 533 is an OR circuit whose output is high if a 1 is present in the output data from the return slot. The output of gate 533 connects to gate 523.

The field of the PAM memory designated RETURN SLOT is used on call transfer or consulation hold type calls. As an illustration, let it be assumed that port 8 is initially served by slot 2. In this case a 2 is written into the TALK SLOT field of the PAM memory. Subsequently, port 8 flashes to initiate a call transfer. At this time, the system assigns a new time slot to port 8. Let it be assumed that it is time slot 5. A 5 is then written into the TALK SLOT field of port 8 and a 2 is written into the return slot portion of the port 8 word. This 2 is subsequently used to serve the original call when the transfer operations are over.

Description of Other System Elements

The SAM memory 507 may comprise Texas Instrument SN74170 integrated circuits (page 9–248) which are 4×4 type memory arrays. These integrated circuits provide separate addresses for writing and reading and permit simultaneous writing and reading. In addition, two Texas Instruments SN74154 integrated circuits (page 9–160) are used to decode the most significant bits for both the read and write addresses. These integrated circuits are four-line to sixteen-line decoders.

The BIM memory 510 and the TAM memory 626 are composed of Texas Instrument SN7489 integrated circuits, which are 16×4 memory arrays. In addition, a Texas Instrument SN74155 integrated circuit (page 9–167) is used to decode the most significant bits of the address and to enable the proper SN7489 integrated circuit in the BIM array. The SN7489 integrated circuits only decode the four least significant bits of the address. An SN74155 is a dual two-line to four-line decoder.

The SOM 531 and HAM 607 memories are coupોsed of conventional pluggable diode matrices.

The hook selector 610 uses Texas Instruments SN74150 integrated circuits (page 9–339) to perform the multiplexing of the hook status information from the line switches to gate 613. In addition, a Texas Instruments SN74154 is used to select the SN74150 which is to be active. In other words, the SN74154 decodes the most significant bits of the port address and the SN74150 circuits decode the least significant bits of the address.

The RING element 628 has a decoder and one monostable circuit for each line switch. The decoder uses Texas Instruments SN74154 integrated circuits which are four-line to sixteen-line decoders. The monostable circuits are Texas Instruments SN74123 integrated circuits (6–29) which are dual monostables per integrated circuit. When activated by the decoder, the monostables produce a pulse of 5 milliseconds duration. The start ringing signal I10 is connected to the enable input of the SN74154 integrated circuits.

The memory element 624 is composed of Texas Instrument SN7401 open collector NAND ciricuits connected in an open collector bus arrangement. The G4, G5, and G6 signals activate groups of these NAND gates to produce a bit pattern which is then applied to gate 623.

The multiplexor 620 described in greater detail in the next section is composed of Texas Instruments SN74157 integrated circuits which are quadruple two-line to one-line data selector.

The PAC 602, SC 502, and FC 504 counters are composed of Texas Instruments SN7493 integrated circuits (page9–24).

The frame address buffer 515 and the post address buffer 606 are composed of SN74175 integrated circuits which are quadruple D-type registers.

DETAILED DESCRIPTION OF THE PIP MEMORY — FIG. 14

FIG. 14 illustrates the details of elements 601, 617, and 620 of FIg. 6. The main element of the PIP memory 601 is the CAM memory element 1401. This element is composed of Signetic 8220 type integrated circuits which are high speed content addressable memories. The Signetic 8220 CAM element is a high-speed monolithic array and is discussed in "Signetics," a catalog issued by Signetics Corp. (1972). The SEARCH input of the CAM element is connected to the A0 and A1 inputs (not shown) and the WRITE input is connected to the W0 and W1 inputs (not shown) of these integrated circuits.

The CAM memory 1401 is both selectively addressable on a random access basis and content addressable. The MATCH output conductors 1404- are low except when they are driven high to indicate a match condition. For example, if during a content addressable search operation, match output conductor 1404-4 will be low if the slot number in word 4 of the memory for port 4 does not match the slot number received by the input leads 1405-. Similarly, if a match does occur, then conductor 1404-4 will be high to indicate that the received slot number is stored in word 4, which is associated with port 4.

The multiplexer 1406 may ideally comprise Texas Instruments SN74157 type integrated circuits which are quad two-to-one data selectors. Whenever the multiplexor's SELECT input is high, the B inputs from the ALL ZEROS circuit 616 are multiplexed through to leads 1405-0 through 1405-n. Whenever the SELECT input is low, the A inputs, which receive the slot number information, are multiplexed through to the 1405- conductors.

The drivers 1407 may comprise Texas Instruments SN7400 type integrated circuits.

The decoder 1408 may comprise Texas Instruments types SN74154 and SN7401 type integrated circuits. The SN74154 integrated circuits decode the information on the port address bus 609. The SN7401 integrated circuits, which are two input open collector NAND gates, have one input connected to an output from the SN74154 circuits and the other input connected to the ENABLE input 1409 of the decoder. If a 4 is present on the port address bus to indicate a port address of 4, the 1410-4 output of the decoder 1408 is high and all the other 1410- outputs are low, provided that the ENABLE input 1409 is high.

The monostable circuit 1411 may be a Texas Instruments type SN74121 integrated circuit.

The circuitry of FIG. 14 performs both selectable write and content addressable search operations. The write operation is first described. EAch word in the CAM memory 1401 is associated with a time division port. If a port is active on a time slot, the word associated with the port in the CAM memory 1401 will contain the number of the slot; if the port is not active, the word associated with the port in the CAM memory contains a 0. Let it be assumed that a 2 representing time slot 2 is to be written into the word for port 4. In this case, the system processes this call during the frame 2 time and the port address of 4 is on the port address bus 609.

The start PIP I1 signal is generated and this causes the write flip-flop 1412 to be preset. This drives the S output of the flip-flop high. When the slot number of 2 equals the frame number of 2, the D signal is driven high from the slot logic circuit 505. The output of AND gate 1413 is now high and this drives the output of NOR gate 1415 low and drives the output of gate 1416 high. The output of INVERTER gate 1416 enables the decoder 1408. With the 4 on the port address bus, all match lines of the CAM memory 1401, with the exception of output conductor 1404-4, are held low by the decoder. The SEARCH input of the CAM memory 1401 is high and the WRITE input is low. The SELECT input of the multiplexor 1406 causes the slot number of 2 from the A input to be applied to input conductor 1405-2. With the slot number of 2 on its 1405-2 input, and with all of the match output conductors other than 1404-4 being held low by the decoder, a slot number of 2 is written into word 4 of the CAM memory 1401. Flip-flop 1412 is reset on the negative transition of the D signal at time T2 on FIG. 9.

A 0 written into word 4 memory 1401 when port 4 goes idle. The system at this time has a 4 on the port address bus and generates the stop PIP I8 signal. The stop PIP signal causes the multiplexor 1406 to connect inputs B, which are all 0s, to the output of the multiplexor. The stop PIP signal into gate 1415 generates the same signals as described in the previous paragraph and causes a 0 to be written into word 4 under control of the decoder 1408.

From FIG. 14 it can be seen that if the stop PIP or start PIP signals are not present, the CAM memory 1401 is in the search mode and the search begins in response to the receipt of the slot number received from the multiplexor 1406. The SEARCH input is low at such times and the WRITE input is high. The decoder 1408 is also disabled. The CAM memory then constantly searches on the S signal which represents the slot number serving the call whose line switches are to be closed. The match lines 1401-0 through 1404-n are connected to the drivers 1407. Let it be assumed that word 4 of the CAM memory contains a slot number of 2 and that a slot number of 2 is now received on the S input. In this case, within 30 to 40 nanoseconds after time T2 of FIG. 9, match line 1404-4 is driven high. The monostable 1411 produces an output pulse which via gate 1417 enables the drivers 1407. The left input of gate 1417 is enabled at this time by gate 1414 which inverts the low from gaae 1416. The driver output 621-4 is driven low and the other driver outputs remain high. This causes line switch 4 to be enabled and closed onto the time division bus at this time. The output pulse from the monostable 1411 is equal to the amount of time in which the line circuits are to be enabled onto the bus. This time is less than 1 microsecond in order to provide a suitable guard interval.

What is claimed is:

1. In a division switching system having a network bus and a plurality of line switches connected to said bus, means for assigning each call served by said system to a unique time slot in a repetitively recurring series of time slots, memory means for associating each line switch currently serving a call with the time slot to which said call is assigned, means effective during each occurrence of a time slot to which a call is assigned for applying signals identifying said time slot to said memory means, and means responsive to the receipt of said time slot identity signals by said memory means for closing all the line switches currently associated with said time slot.

2. The system of claim 1 in which said means for closing comprises, a plurality of memory output conductors each of which is unique to one of said line switches and each of which extends from said memory means to its associated line switch, and means including said memory means for applying line switch closing signals to each of sid conductors connected to any one of said line switches currently associated with said time slot.

3. In a time division switching system having a network bus and a plurality of line switches each of which is connected to said bus, means for assigning each call served by said system to a unique time slot in a repetitively recurring series of time slots, means for determining the line switches serving each call currently being serves by said sytem, a port pulser memory, means responsive to said determination for entering information identifying each line switch currently serving a call into said port pulser memory, means effective upon each occurrence of a time slot to which a call is currently assigned for applying the identity of said time slot to said port pulser memory, and means responsive to each receipt of said time slot identity by said port pulser memory for closing each line switch currently serving said call.

4. The system of claim 3 in combination with a word location in said port pulser memory unique to each of said line switches, means for entering into each location whose line switch is currently serving a call the identity of the time slot to which said call is assigned, means responsive to each subsequent receipt of said time slot identity by said port pulser memory for effecting a content addressable search of said port pulser memory to identify each memory location currently storing said received time slot identity, and means responsive to said content addressable search for applying line switch closing signals to each of said line switches currently serving the call assigned to said identified time slot.

5. In a time division switching system having a network bus and a plurality of line switches each of which is connected to said bus, a slot counter for generating a repetitively recurring series of time slots, means for assigning each call served by said system to a unique time slot in said series of time slots, a port address memory for determining the line switches serving each call currently being served by said system, a port pulser memory, means effective upon each ocurrence of a time slot to which a call is currently assigned for applying the identity of said time slot to said port pulser memory, means responsive to each receipt of said time slot identity by said port pulser memory for identifying the line switches serving the call assigned to said time slot, means responsive to said line switch identification for closing each identified line switch during the occurrence of said time slot, means for generating a repetitively recurring series of time frames each of which comprises a plurality of said time slots, means for assigning each call served by said system to a unique time frame in said series of time frames, and call processing means for processing information signals for each call only during each occurrence of the time frame to which said call is assigned.

6. The system of claim 5 in which said means for closing further comprises, a word location in said port pulser memory unique to each of said line switches, means for entering into each location whose line switch is currently serving a call the identity of the time slot to which said call is assigned, means responsive to each subsequent receipt of said time slot identity by said port pulser memory for effecting a content addressable search of said port pulser memory to identify each memory location currently storing said received time slot identity, a plurality of memory output conductors each of which is unique to one of said line switches and each of which extends from said port pulser memory to its associated line switch, and means responsive to said content addressable search for applying line switch closing signals to each of said conductors extending to a switch currently serving the call assigned to the time slot whose identity is received by said port pulser memory.

7. In a line switch controller for a time division switching system in which each call served by said system is assigned to a unique time slot in a repetitively recurring series of time slots, a memory having a plurality of word locations each of which is individual to a different one of said line switches, means for selectively writing information comprising the identity of a time slot to which a call is assigned into the word location of each line switch serving said call, and means for subsequently applying said time slot identity information to said memory for identifying all switches currently serving the call assigned to said time slot.

8. The system of claim 7 in which said means for writing said time slot identity comprises, means for concurrently applying a write signal to a first input of said memory, means for applying said time slot identity to a second input of said memory, and means for applying a signal to a memory output conductor unique to the word location into which said time slot identity is to be written.

9. The system of claim 8 in which said means for identifying said line switches comprises, means for applying a search signal to a third input of said memory, said memory being responsive to the concurrent receipt of said search signal and said slot identity applied to said second input to effect a content addressable search of said word locations to identify all locations currently storing said time slot identity.

10. The system of claim 9 in combination with a plurality of output conductors each of which extends from a different one of said memory word locations to the line switch associated with each location, and means responsive to said content addressable search for applying line switch closing signals to the conductors extending to said identified switches.

11. The method of operating a time division division switching system comprising the steps of, assigning each call served by said system to a unique time slot in said repetitively recurring series of time slots, determining the line switches serving each call currently being served by said system, storing in a port pulser memory information associating each line switch currently serving a call with the identity of the time slot to which the call is assigned, applying to said port pulser memory the identity of the time slot to which a call is assigned upon each occurrence of said time slot, and closing the line switches serving said call upon each receipt of said time slot identity by said port pulser memory.

12. The method of claim 11 in combination with the additional steps of, generating a repetitively recurring series of time frames each of which comprises a plurality of said time slots, assigning each call currently being served by said system to a unique time frame in said series of time frames, and processing information signals for a call only during each occurrence of the time frame to which said call is assigned.

13. The method of operating a time division switching system comprising the steps of, generating a repetitively recurring series of time slots, assigning each call currently being served by said system to a unique time slot in said series of time slots, determining the line switches serving each call, entering the identity of each time slot currently serving a call into a port pulser memory having a word location unique to each line switch with each time slot identity being entered into the location of each line switch serving the call assigned to said identified time slot, applying to said port pulser memory the identity of a time slot to which a call is assigned upon each occurrence of said time slot, and applying line switch closing signals to the line switches serving said call upon each receipt of said time slot identity by said port pulser memory.

14. The method of claim 13 in combination with the additional steps of, performing a content addressable search within said port pulser memory upon each receipt of a time slot identity to identify each memory word location currently storing said received time slot identity, and applying line switch closing signals to output conductors extending from said port pulser memory to the line switches associated with each identified word location.

15. The method of claim 14 in combination with the additional steps of, generating a repetitively recurring series of time frames each of which comprises a plurality of said time slots, assigning each call currently being served by said system to a unique time frame in said series of time frames, and processing information signals for a call only during each occurrence of the time frame to which said call is assigned.

* * * * *